(12) United States Patent
Schreck et al.

(10) Patent No.: US 12,341,898 B2
(45) Date of Patent: Jun. 24, 2025

(54) SYSTEMS AND METHODS FOR SELECTIVELY INDEXING BLOCKCHAIN OPERATIONS BY PARSING RAW BLOCKCHAIN DATA FOR RELEVANT DATA PRIOR TO EXECUTING CONFIRMATORY FUNCTION CALLS

(71) Applicant: Coinbase, Inc., Oakland, CA (US)

(72) Inventors: Ben Schreck, Oakland, CA (US); Ejaaz Ahamadeen, Oakland, CA (US); Jing Fan, Oakland, CA (US); Peter Jihoon Kim, Oakland, CA (US); Olivia Thet, Oakland, CA (US); Matt Moore, Oakland, CA (US); Ankit Chiplunkar, Oakland, CA (US)

(73) Assignee: Coinbase, Inc., Oakland, CA (US)

( * ) Notice: Subject to any disclaimer, the term of this patent is extended or adjusted under 35 U.S.C. 154(b) by 404 days.

(21) Appl. No.: 17/812,690

(22) Filed: Jul. 14, 2022

(65) Prior Publication Data
US 2024/0022424 A1 Jan. 18, 2024

(51) Int. Cl.
*H04L 9/32* (2006.01)
*H04L 9/08* (2006.01)

(52) U.S. Cl.
CPC .......... *H04L 9/3236* (2013.01); *H04L 9/0825* (2013.01); *H04L 9/0894* (2013.01); *H04L 9/3247* (2013.01)

(58) Field of Classification Search
CPC ... H04L 9/3236; H04L 9/0825; H04L 9/0894; H04L 9/3247
See application file for complete search history.

(56) References Cited

U.S. PATENT DOCUMENTS

| 11,616,650 | B1* | 3/2023 | Panjwani | H04L 9/3247 |
| | | | | 713/168 |
| 11,860,858 | B1* | 1/2024 | McKervey | H04L 9/3297 |
| 2019/0238525 | A1* | 8/2019 | Padmanabhan | H04L 63/101 |
| 2020/0084049 | A1* | 3/2020 | Lindell | H04L 9/085 |
| 2020/0174937 | A1* | 6/2020 | Yao | G06F 21/64 |
| 2021/0103582 | A1* | 4/2021 | Wentworth | G06F 16/2365 |
| 2021/0165890 | A1* | 6/2021 | Schvey | G06F 21/6218 |
| 2022/0014905 | A1* | 1/2022 | Mastenbrook | H04L 9/0643 |

(Continued)

FOREIGN PATENT DOCUMENTS

| WO | WO-2020249572 A1 * | 12/2020 | G06F 21/51 |
| WO | WO-2023220552 A2 * | 11/2023 | G06F 8/427 |

*Primary Examiner* — Darshan I Dhruv
(74) *Attorney, Agent, or Firm* — Foley & Lardner LLP

(57) ABSTRACT

Methods and systems for parsing and identifying unindexed parameters and other information (e.g., a token contract address) that may appear encoded in event data. Specifically, the system may retrieve bytecode for an identified blockchain operation (e.g., a transaction). The system may then segregate the bytecode into constructor arguments, code sections, and/or metadata. The system may then parse the segregated portions of bytecode for bytecode representations that are based on function signatures, event signatures, token standards, and/or contract addresses. In some embodiments, the system may further narrow the pool of known bytecode representations that are compared against the remaining sections of bytecode based on bytecode representations corresponding to a particular type of blockchain network standard.

17 Claims, 11 Drawing Sheets

(56) References Cited

U.S. PATENT DOCUMENTS

2022/0045867 A1* 2/2022 Beery ................... H04L 9/0861
2022/0318907 A1* 10/2022 Bleznak ............... G06Q 20/065
2023/0177496 A1* 6/2023 Le Van Gong .... G06Q 20/3825
2023/0291544 A1* 9/2023 Turner .................. H04L 9/3247
2023/0367566 A1* 11/2023 Dubrofsky .............. G06F 8/427

* cited by examiner

100 function name() public view returns (string)
function symbol() public view returns (string)
function decimals() public view returns (uint8)
function totalSupply() public view returns (uint256)
function balanceOf(address _owner) public view returns (uint256 balance)
function transfer(address _to, uint256 _value) public returns (bool success)
function transferFrom(address _from, address _to, uint256 _value) public returns (bool success)
function approve(address _spender, uint256 _value) public returns (bool success)
function allowance(address _owner, address _spender) public view returns (uint256 remaining) ⟵ 102

FIG. 1A

150 eth.getTransactionReceipt("0e4bda241bc21765b21701b639fe"); ← 152 logs: ( ← 154
  address: "0x7856181 3fb0cfad68637ca993",
  blockHash: "0x40a0d5fa545f34b33bf1eb94b60bb7c86c2abc269d272f", ← 160
  blockNumber: 92,
  data: "0x",
  logIndex: 0,
  removed: false,
  topics: ← 158
  ["0x320ecede328aacf4e2813ac7c426ee41f4ae29fd40781f9138d14e8",
   "0x0000000000000498f0c607d9cf0acaa2f65b0",
   "0x00000000000048b2bc107c8431d15aa4e0f8fd41"],
  transactionHash: "0xed08a57547c40bad3b1bc21765b21701b639fe"]
  transactionIndex: 0
)

182 → 6080604052b004361060485766ffffff7c010000000000000000000000000000000000000000000000000000000000000000000003504166310003e2d2811460
4578063b69ef8a81460745756b600080fd5b3480156605857600080fd5b506
062600456086565b6040805191825251908190036020019f35b3480156
07f57600080fd550606260955565b600080548201908190550565b6
000548156005a165627a7a7230582063aa00920d824233ab5307ef3a379c
757bdbee62fe00fe36a5d852c766e58fef0029 ← 186

184

190

Contract JSON ABI

[{"constant":true,"inputs":[],"name":"testFunc","outputs":[{"name":"","type":"int256"}],"payable":false,"stateMutability":"pure","type":"function"}]

SYSTEMS AND METHODS FOR SELECTIVELY INDEXING BLOCKCHAIN OPERATIONS BY PARSING RAW BLOCKCHAIN DATA FOR RELEVANT DATA PRIOR TO EXECUTING CONFIRMATORY FUNCTION CALLS

BACKGROUND

In recent years, the use of blockchains and blockchain technology has exponentially increased. Blockchains comprise a list of records, called "blocks," that are "chained" together using cryptography. Each block may comprise data that is computed using a one-way function (e.g., a function that is practically impossible to invert or reverse-compute) of a previous block, a timestamp (e.g., indicating a creation and/or modification time), and additional data (e.g., transactional or operational data related to blockchain operations).

While publicity for blockchains and blockchain technology has been concentrated on its use for cryptocurrencies and smart contracts, blockchains and blockchain technology may be applicable to numerous technological avenues. A common theme of the technological avenues is the manner in which blockchains and blockchain technology are decentralized such that facilitation, management, and/or verification of blockchain-based operations is governed or administered not by any one authority but instead by a community of users. The blockchain may therefore remain distributed (e.g., on a network of computers that communicate and coordinate their actions by passing messages to one another), and in many cases public, through a digital ledger, which records the series of blocks forming the chain. Notably, because each block depends on a preceding block, edits to existing blocks in the chain may not be made without affecting subsequent blocks.

Furthermore, updates to the blockchain (e.g., the addition of new blocks) may include incentivization systems that reward community members for the generation of the updates while also ensuring a consensus by the community. By doing so, the proliferation of the blockchain may proceed indefinitely.

SUMMARY

Methods and systems are described herein for novel uses and/or improvements to blockchains and blockchain technology. As one example, methods and systems are described herein for improved indexing of blockchains and blockchain operations, and in particular for detecting. For example, as the number, type, and/or complexity of blockchain operations increases, these blockchain operations often need to access a state of the blockchain (e.g., reflecting recorded transactions and positions of digital assets). However, determining a current state of the blockchain faces numerous technical problems. First, blockchain networks due not include a query language (i.e., a programming language for generating inquires to the blockchain network).

In view of this first technical problem, to access the state, conventional systems use indexing applications that fetch the raw blockchain data from a blockchain node, process the raw data, and store the processed data in an organized manner. The processed data may then be accessed and searched in a more efficient way than directly referring to the blockchain. However, indexing applications face a second technical problem when attempting to index blockchain data. Namely, the sequential nature of blocks does not allow for the storing of all information in one block of a blockchain. Instead, each block saves a "hash" of a previous block and is populated with new information. Accordingly, gathering all information related to a given smart contract, blockchain operation history, etc., requires querying numerous previous blocks in the blockchain to compile all historical information, which requires significant time and resource commitments.

To minimize the time and resource commitments, conventional systems rely on conventional token standards to determine how and what information is indexed. For example, in the Ethereum network, events generate three parameters that are conventionally indexed: 1) a sent by address; 2) a received by address; and 3) a sent by an address to a specific received address. However, an event may include any number of parameters and/or token contract addresses, which are left unindexed, and may be required for new blockchain operations and/or applications. Conventional systems have no means for indexing these additional parameters and/or token contract addresses, as well as compiling historical information about these additional parameters and/or token contract addresses.

To overcome these technical deficiencies in conventional systems, methods and systems disclosed herein for parsing and identifying unindexed parameters and other information (e.g., a token contract address) may appear encoded in event data. Specifically, the system may retrieve bytecode for an identified blockchain operation (e.g., a transaction). The system may then segregate the bytecode into constructor arguments, code sections, and/or metadata. The system may then parse the segregated portions of bytecode for bytecode representations that are based on function signatures, event signatures, token standards, and/or contract addresses. In some embodiments, the system may further narrow the pool of known bytecode representations that are compared against the remaining sections of bytecode based on bytecode representations corresponding to a particular type of blockchain network standard.

In some aspects, systems and methods for generating bytecode representations used to identifying unindexed parameters and other information in raw blockchain data are described. For example, the system may retrieve a first indicium of a plurality of indicia of bytecode representations that correspond to a first type of blockchain network standard of a blockchain network, wherein the plurality of indicia are based on: retrieving a plurality of bytecode samples corresponding to the first type of blockchain network standard of the blockchain network; and parsing the plurality of bytecode samples to identify the plurality of indicia of bytecode representations that correspond to the first type of blockchain network standard. The system may retrieve a first bytecode sample corresponding to a first block of the blockchain network. The system may compare the first indicium to the first bytecode sample to determine a first probability that the first block comprises a first bytecode representation corresponding to the first type of blockchain network standard. The system may compare the first probability to a threshold probability. The system may, in response, determine that the first probability equals or exceeds the threshold probability, and identify a first bytecode representation in the first bytecode sample.

To further exacerbate the technical problems discussed above, generating database indexes for historical transactions is problematic, as historical indexing often needs to be limited to particular contract addresses, which are only in the admitted logs (e.g., raw blockchain data). As stated above, conventional indexing applications do not index this information, as they rely on conventional token standards to determine how and what information is indexed, which is limited to: 1) a sent by address; 2) a received by address; and 3) a sent by an address to a specific received address.

In view of this, the methods and systems described herein relate to improved historical indexing of transactions related to a particular token. Specifically, the system may retrieve raw blockchain data. The system may then parse the raw blockchain data to identify a bytecode representation of a contract address. The system may then compare known bytecode representations of contract addresses (e.g., contract addresses that have been previously indexed) to the remaining sections of the bytecode by iterating through known contract addresses (e.g., corresponding to different standards) to determine if this contract address has been previously indexed. If the contract address has been previously indexed, the event data for the transaction is retrieved and indexed. If the contract address has been previously indexed, the system generates a new known contract address.

In some aspects, systems and methods for indexing blockchain operations based on identifying unindexed parameters and other information in raw blockchain data samples are described. For example, the system may retrieve a first bytecode sample corresponding to a first blockchain operation in a first block of a blockchain network. The system may parse the first bytecode sample to identify a first bytecode representation corresponding to a first contract address. The system, in response to identifying the first bytecode representation, may compare the first contract address to a plurality of known contract addresses to determine whether the first contract address is included in the plurality of known contract addresses. The system may, in response to determining that the first contract address is included in the plurality of known contract addresses, may retrieve a first known contract address for the first contract address. The system may index, using an indexing application, the first block by recording the first blockchain operation as corresponding to the first known contract address.

To further exacerbate the technical problems discussed above, while many indexes parse a blockchain for relevant smart contracts (e.g., contracts corresponding to a particular standard), some relevant contracts may not conform to the standard. For example, some ERC-721 contracts do not follow the standard as they were deployed before the ERC-721 standard was confirmed. This presents an additional technical problem for indexing applications, both when identifying relevant contracts, and when testing any deployed contract without spending gas. Conventional solutions to this problem include using either a live testing technique (e.g., deploying a smart contract written explicitly for testing to the mainnet and then calling that contract) or using an estimateGas function (e.g., a native network function used to determine the gas fee of a transaction without committing the transaction). However, both solutions are time consuming and require testing on an individual smart contract level. Another conventional solution is to identify every contract that includes at least one compliant transfer event. However, this solution may return too many potential smart contracts (i.e., smart contracts corresponding to the desired standard, but also many undesired standards). This technical problem is only exacerbated as new standards are created that include at least one compliant transfer event. Thus, these solutions are ill-fitted for parsing the nearly unlimited amount of committed smart contracts that may be relevant.

In contrast to the aforementioned conventional solutions, the methods and systems described herein provide for a novel approach to blockchain parsing and overcome the aforementioned technical challenges. That is, the methods and systems do not require live testing, use of the estimateGas function, and do not result in the overwhelming number of false positives found in relying on compliant transfer events. Specifically, the system retrieves a plurality of standard-specific constants (e.g., "ERC721 EIP165ID"). Next, the system evokes an application binary interface (ABI) encoding function to generate a bytecode representation for the standard-specific private constraints (e.g., "abi.encodeWithSignature( . . . )"). Upon detecting that bytecode for a given smart contract includes the bytecode representations, the system confirms that the given smart contract is of the relevant type using a function that does not allow a state change operation to the blockchain (e.g., "contractAddress.staticcall . . . ").

In some aspects, systems and methods for selectively indexing blockchain operations by parsing raw blockchain data for relevant smart contracts prior to executing confirmatory function calls are described. For example, the system may receive a first input, wherein the first input indicates a first type of blockchain network standard of a plurality of types of blockchain network standards for detection. The system may, in response to receiving the first input, determine a first standard-specific constant corresponding to the first type of blockchain network standard. The system may generate a first bytecode representation of the first standard-specific constant. The system may retrieve a first bytecode sample corresponding to a first block of a blockchain network. The system may parse the first bytecode sample using the first bytecode representation to determine a first probability that the first block comprises a first blockchain operation corresponding to the first type of blockchain network standard. The system may compare the first probability to a threshold probability. The system may, in response, determine that the first probability equals or exceeds the threshold probability, and execute a first function on the first block to confirm that the first blockchain operation corresponds to the first type of blockchain network standard.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 1A shows illustrative pseudocode for executing a blockchain operation and/or other function at a blockchain node, in accordance with one or more embodiments.

FIG. 1C shows illustrative pseudocode representing a blockchain operation of a call on a smart contract, in accordance with one or more embodiments.

FIG. 1D shows an illustrative bytecode sample, in accordance with one or more embodiments.

DETAILED DESCRIPTION OF THE DRAWINGS

Figure 1B:
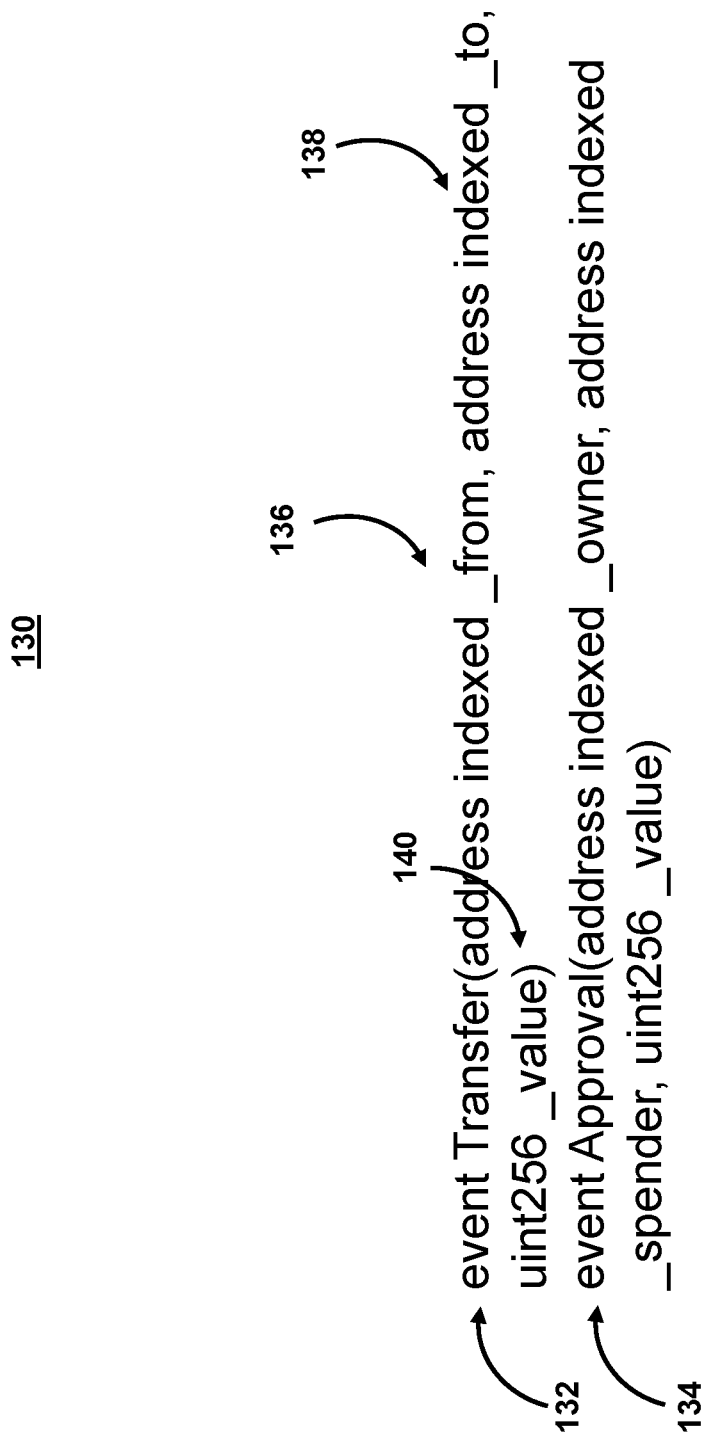
FIG. 1B shows illustrative pseudocode for logging a change of state to a blockchain, in accordance with one or more embodiments.

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Methods and systems are described herein for novel uses and/or improvements to blockchains and blockchain technology. As one example, methods and systems are described herein for improved indexing of blockchains and blockchain operations. For example, as the number, type, and/or complexity of blockchain operations increases, these blockchain operations often need to access a state of the blockchain (e.g., reflecting recorded transactions and positions of digital assets). To access the state, conventional systems use indexing applications that fetch the raw blockchain data from a blockchain node, process the raw data, and store the processed data in an organized manner. The processed data may then be accessed and searched in a more efficient way than directly referring to the blockchain.

Conventional systems, however, rely on conventional token standards for what information is indexed. For example, in the Ethereum network, events generate three parameters that are conventionally indexed: 1) a sent by address; 2) a received by address; and 3) a sent by an address to a specific received address. However, an event may include any number of parameters, which are left unindexed, and may be required for new blockchain operations and/or applications. Conventional systems have no means for indexing these additional parameters.

Additionally, the serially nature of blockchains in which linked data resides across numerous blocks causes there to be no built-in mechanism to identify, categorize, and/or query the blockchain for specific data. The methods and systems described herein relate to improvements to the indexing of the blockchain in order to allow users to search the blockchain for specific transactions, smart contracts, and/or other characteristics.

FIG. 1A shows illustrative pseudocode for executing a blockchain operation and/or other function at a blockchain node, in accordance with one or more embodiments. For example, pseudocode 100 may represent pseudocode used for performing one or more functions in Ethereum. The one or more functions may be used to perform blockchain operations. As referred to herein, "blockchain operations" may comprise any operations including and/or related to blockchains and blockchain technology. For example, blockchain operations may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain operation may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain operation may comprise the creation, modification, exchange, and/or review of a token (e.g., a digital asset-specific blockchain), including a nonfungible token. A nonfungible token may comprise a token that is associated with a good, a service, a smart contract, and/or other content that may be verified by, and stored using, blockchain technology.

In some embodiments, blockchain operations may also comprise actions related to mechanisms that facilitate other blockchain operations (e.g., actions related to metering activities for blockchain operations on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain operation (e.g., computation, data access, transaction, etc.). Each blockchain operation has a predetermined cost in units of gas (e.g., as determined based on a predefined set of rules for the system). When a blockchain operation triggers the execution of a smart contract, the blockchain operation may include an amount of gas that sets the upper limit of what can be consumed in running the smart contract. The system may terminate execution of the smart contract if the amount of gas consumed by computation exceeds the gas available in the blockchain operation. For example, in Ethereum, gas comprises a mechanism for allowing Turing-complete computation while limiting the resources that any smart contract and/or blockchain operation may consume.

In some embodiments, gas may be obtained as part of a blockchain operation (e.g., a purchase) using a network-specific cryptocurrency (e.g., ether in the case of Ethereum). The system may require gas (or the amount of the network-specific cryptocurrency corresponding to the required amount of gas) to be transmitted with the blockchain operation as an earmark to the blockchain operation. In some embodiments, gas that is earmarked for a blockchain operation may be refunded back to the originator of the blockchain operation if, after the computation is executed, an amount remains unused.

For example, the system may execute pseudocode 100 to perform one or more blockchain operations. In some embodiments, the system may also use one or more ABIs. An ABI is an interface between two program modules, often between operating systems and user programs. ABIs may be specific to a blockchain protocol. For example, an Ethereum virtual machine (EVM) is a core component of the Ethereum network, and a smart contract may be a piece of code stored on the Ethereum blockchain, which are executed on EVM. Smart contracts may be written in high-level languages such as Solidity or Vyper, and may be compiled in EVM-executable bytecode by the system. Upon deployment of the smart contract, the bytecode is stored on the blockchain and is associated with an address. To access functions defined in high-level languages, the system translates names and arguments into byte representations for byte code to work with it. To interpret the bytes sent in response, the system converts back to the tuple (e.g., a finite ordered list of elements) of return values defined in higher-level languages. Languages that compile for the EVM maintain strict conventions about these conversions, but in order to perform them, the system must maintain the precise names and types associated with the operations. The ABI documents these names and types precisely, and in an easily parseable format, doing translations between human-intended method calls and smart contract operations discoverable and reliable.

For example, ABI defines the methods and structures used to interact with the binary contract similar to an API, but on a lower-level. The ABI indicates the caller function used to encode needed information, such as function signatures and variable declarations, in a format that the EVM can understand. ABI encoding may be automated by the system using compilers or wallets interacting with the blockchain.

As shown in FIG. 1A, pseudocode 100 includes functions that may cause one or more events (e.g., as described in FIG. 1B) to be generated. For example, parameter 102 may cause a smart contract implementing the corresponding function to fire the event. As such, when the blockchain operation is processed for that function, the logged event will also be included in the mined block, along with the parameter data it is called with.

FIG. 1B shows illustrative pseudocode for logging a change of state to a blockchain, in accordance with one or more embodiments. For example, pseudocode 130 may represent pseudocode used for one or more events in Ethereum. For example, pseudocode 130 may include a transfer event (e.g., event 132) and an approval event (e.g., event 134). Events may be signals that the smart contracts may generate. An indexer (or other component connected to a blockchain network) may monitor for these events and the event parameters. The indexer may then index the event in an event history so that it may be searched for later. However, pseudocode 130 gives an example based on conventional token standards for what information is indexed. For example, in the present case (e.g., based on the Ethereum ERC-20 standard), events generate three parameters that are conventionally indexed, such as a sent by address (e.g., parameter 136), a received by address (e.g., parameter 138), and a transferred amount (e.g., parameter 140). The system may also record a sent by address to a specific received by address (e.g., based on parameter 136 and parameter 138). However, an event may include any number of parameters, which are left unindexed, and may be required for new blockchain operations and/or applications. Conventional systems have no means for indexing these additional parameters. As one example, conventional systems have no means for indexing a contract address.

For example, a smart contract address refers to an address location of the actual token contract that manages the logic for the smart contract. This address is distinguishable from a sent by address (e.g., parameter 136) and a received by address (e.g., parameter 138). Additionally, the smart contract address is not indexed in an event (e.g., an event shown in pseudocode 130). The smart contract address may be needed to review information about a smart contract, such as a current balance and/or the smart contract details. For example, the smart contract may correspond to a contract account on a given blockchain network.

As an example, the smart contract may be programmed using a programming language that is native to and/or developed for a given blockchain. For example, a smart contract for Ethereum may be written in Solidity, which is a statically-typed curly-braces programming language designed for developing smart contracts that run on Ethereum language and is designed for running on the EVM. The contract account may be comprised of a series of functions (contract functions such as those shown in FIG. 1A) and data (contract status). The smart contract may be stored at the smart contract address on the respective blockchain, which manages the logic for the tokens.

Additionally, parameter 136 and parameter 138 are labeled as "indexed" in pseudocode 130. The indexed keyword causes the virtual machine executing the smart contract to place the argument in the topics section of the event data, which allows them to be easily searched and filtered based on that data. However, in some blockchains (e.g., Ethereum) each event is limited to a total of three indexed topics, while unindexed parameters appear encoded in the event data.

In some embodiments, the system may also use one or more ABIs. The ABI may be an interface between two program modules, often between operating systems and user programs. ABIs may be specific to a blockchain protocol. For example, an EVM is a core component of the Ethereum network, and a smart contract may be a piece of code stored on the Ethereum blockchain, which are executed on EVM. Smart contracts written in high-level languages like Solidity or Vyper may be compiled in EVM-executable bytecode by the system. Upon deployment of the smart contract, the bytecode is stored on the blockchain and is associated with an address. To access functions defined in high-level languages, the system translates names and arguments into byte representations for byte code to work with it. To interpret the bytes sent in response, the system converts back to the tuple (e.g., a finite ordered list of elements) of return values defined in higher-level languages. Languages that compile for the EVM maintain strict conventions about these conversions, but in order to perform them, the system must maintain the precise names and types associated with the operations. The ABI documents these names and types precisely, and in an easily parseable format, doing translations between human-intended method calls and smart contract operations discoverable and reliable.

FIG. 1C shows illustrative pseudocode representing a blockchain operation of a call on a smart contract, in accordance with one or more embodiments. For example, based on a smart contract and blockchain operations (e.g., transactions) conducted with the smart contract, an event log may be generated by loading the blockchain operation of the call that generated the event.

The event log may be based on call 152 as shown in FIG. 1C. In response, the system may generate log 154. Log 154 may include various encoded information. For example, event topics 156 may include encoded signatures of the event and the addresses of the accounts involved in the blockchain operation (e.g., event topics 156 includes three parameters). Log 154 may also include an additional data field (e.g., field 158), which may include additional data for unindexed parameters.

For example, event topics 156 may comprise a signature (e.g., a keccak256 hash) of the name of the event that occurred in the smart contract, including the types (uint256, string, etc.) of its parameters. However, as topics (e.g., event topic 156) hold a maximum of 32 bytes of data, conventional data structures such as arrays or strings may not be used as topics reliably and are instead recorded in a data log.

Log 154 may also include a hash (e.g., hash 160). For example, a hash is a mathematical function that converts an input of arbitrary length into an encrypted output of a fixed length (e.g., hash 160). For example, regardless of the original amount of data or file size involved, a unique hash will always be the same size. Moreover, hashes cannot be used to "reverse-engineer" the input from the hashed output, since hash functions are "one-way." However, the same function on the same data will generate the same hash. Thus, the system may validate that the data is the same (e.g., unaltered) if the system already knows its hash.

Each blockchain block may comprise a blockhash (e.g., blockhash 160), which is a reference number for the block in the blockchain. For example, each block may contain the hash of the block header of the previous block, ensuring that nothing has been tampered with as new blocks are added.

FIG. 1D shows an illustrative bytecode sample, in accordance with one or more embodiments. For example, FIG. 1D includes a bytecode sample (e.g., bytecode 180). For example, bytecode 180 may comprise a bytecode sample corresponding to a first blockchain operation in a first block of a blockchain network. Bytecode 180 may comprise bytecode that was compiled based on another programming language (e.g., Solidity). Bytecode 180 may comprise a bytecode outputted by an EVM. For example, EVM bytecode is a low-level programming language which is compiled from a high-level programming language, such as Solidity. EVM is a virtual machine placed between operating system and application layer to mitigate operating system dependency. For example, bytecode 180 may comprise a HEX format of a runtime bytecode (e.g., a binary string). That is, bytecode 180 may represent bytecode prior to being output by an ABI. Bytecode 190 may comprise bytecode 180 after being output by an ABI.

While bytecode 180 is not human readable, the system may parse bytecode 180 to identify a bytecode representation. For example, a bytecode representation may comprise a section of a bytecode sample that may indicate function signatures, event signatures, token standards, and/or contract addresses. For example, the system may detect bytecode representation 182 and based on bytecode representation 182, determine that bytecode 180 corresponds to one or more function signatures, event signatures, token standards, and/or contract addresses.

For example, bytecode 180, while not human readable, is based on EVM opcodes. An opcode is an instruction of the EVM. Each opcode itself is an 8-bit unsigned integer. For example, means STOP, 0x01 means ADD. For example, bytecode 180 includes bytecode representation 182. Bytecode representation 182 may be deconstructed based on the EVM opcodes as shown:
  00: 6080 PUSH1 0x80
  02: 6040 PUSH1 0x40
  04: 52 MSTORE From bytecode representation 182, the system may determine that bytecode 180 includes two EVM opcodes (e.g., "PUSH1" and "MSTORE"). Each opcode includes an instructions. For example, PUSH1 instructs the system to push a 1-byte integer into the stack for future use, whereas MSTORE saves a word to memory. As such, the first two PUSH1 opcodes will push 0x80 and into the stack. MSTORE will then use the two items in the stack for the memory write operation.

For example, the system may identify a combination of characters (e.g., representing bytecode representation 182). The system may use the presence of bytecode representation 182, a location of the bytecode representation 182 within the bytecode 180, and/or the presence (and/or location) of other bytecode representations (e.g., bytecode representation 184 and bytecode representation 186) to determine one or more function signatures, event signatures, token standards, and/or contract addresses corresponding to bytecode 180.

Furthermore, the system may detect individual characters, combination of characters, and/or the location of the characters and/or combinations as indicia of bytecode representations. For example, the system may detect character strings of variable or fixed lengths and locations within bytecode of the character strings to determine a probability of a bytecode representation (e.g., bytecode representation 182) in a bytecode sample (e.g., bytecode 180). For example, a location of bytecode representation 182 near the beginning of bytecode 180 may cause the system to determine that bytecode representation 182 relates to a different function signature, event signature, token standard, and/or contract address (e.g., blockchain characteristics) than bytecode representation 186, as bytecode representation 186 is near the end of bytecode 180.

The system may then compare the current blockchain operation characteristics to the retrieved values (or confidence thresholds based on the retrieved values) for indicia, bytecode samples, and/or bytecode representations (e.g., blockchain characteristics). For example, the system may generate one or more thresholds (e.g., a threshold corresponding to a given likelihood that one or more indicia, bytecode samples, and/or bytecode representations correspond to one or more other indicia, bytecode samples, and/or bytecode representations). The thresholds may be based on meeting a certain percentile of a probability that the two data sets match, correspond, and/or are similar.

Similarly, the system may process compiled and decompiled code. For example, as with the analysis of bytecode 180, the system may also process bytecode 190 and/or identify a function signature, event signature, token standard, and/or contract address based on bytecode representations in bytecode 190 (e.g., bytecode representation 188). In such cases, the system may identify keywords, semantic annotations, tags, and/or attributes (e.g., blockchain characteristics) in the samples.

For example, the system may identify a plurality of indicia of bytecode representations that correspond to a first type of blockchain network standard of a blockchain network. The system may identify patterns in bytecode sample to assign weights to different indicia and to detect known bytecode representations. For example, the system may retrieve a plurality of bytecode samples corresponding to the first type of blockchain network standard of the blockchain network. The system may then parse the plurality of bytecode samples to identify the plurality of indicia of bytecode representations that correspond to the first type of blockchain network standard.

In some embodiments, the system may use one or more artificial intelligence and/or machine learning models (referred to herein collectively as "model") to identify the plurality of indicia and/or bytecode representation. Additionally or alternatively, the system may use one or more artificial intelligence and/or machine learning models to detect the patterns of indicia and bytecode representation, for example, determine what indicia and/or patterns indicate one or more function signatures, event signatures, token standards, and/or contract addresses corresponding to bytecode 180.

In some embodiments, the system may use an artificial intelligence or machine learning model to determine a probability related to the presence of patterns, indicia, and bytecode representation, and/or whether to determine what indicia and/or patterns indicate one or more function signatures, event signatures, token standards, and/or contract addresses corresponding to bytecode 180. For example, the determination may be an output shown on a user device and/or an output sent to another system component.

Additionally or alternatively, the system may compare and contrast the information using natural language processing. For example, the system may use fuzzy logic and/or other techniques for comparing linguistic and/or categorical variables. Based on the comparison of the human readable and/or machine-readable code, the system may find common characteristics between indicia, bytecode samples, and/or bytecode representations. In such cases, the machine learning model may determine keyword similarities and/or semantic closeness between keywords in the first and second indicia, bytecode samples, and/or bytecode representations, respectively, or the first and second blockchains operations. For example, the system may then retrieve a first keyword for labeled indicia, bytecode samples, and/or bytecode representations and retrieve a second keyword for unknown indicia, bytecode samples, and/or bytecode representations. The system may then determine a first similarity between the first keyword and the second keyword. For example, the system may determine a vector space distance between two textual entities (keywords, hashes, documents, etc.). The system may then compare the first similarity to a threshold similarity. The system may then determine that the first keyword and the second keyword correspond based on the first similarity equaling or exceeding the threshold similarity (and not correspond otherwise).

For example, a model may take inputs and provide outputs. The inputs may include multiple data sets, such as a training data set and a test data set. This training data may comprise a labeled training data pulled from an indexing application that indicates indicia, bytecode, and/or bytecode representations (e.g., blockchain characteristics). Based on the indicia, bytecode, and/or bytecode representations, the system may determine a probability for attributing to a given blockchain operation and/or bytecode sample based on detected indicia, bytecode, and/or bytecode representations (e.g., within a percentile of probability).

In some embodiments, the training data set and test data set may be divided from a set of available and/or historical data. The split may be 60-80% training data and 20-40% testing data (e.g., for in-time validation). For example, the system may adjust the split based on numerous factors. For example, the test data set is used by the system to measure the performance in a real scenario on unseen data. Accordingly, the system may modify the split based on how much is needed for an accurate measurement, which further depends on the level of accuracy needed and the amount of variance expected. In some instances, if the total amount of training data is low, the system may reduce or increase the amount of training data in the split.

In one use case, outputs may be fed back to a model as input to train the model (e.g., alone or in conjunction with user indications of the accuracy of outputs, labels associated with the inputs, or with other reference feedback information). In another use cases, a model may update its configurations (e.g., weights, biases, or other parameters) based on its assessment of its prediction (e.g., outputs) and reference feedback information (e.g., user indication of accuracy, reference labels, or other information). In another use case, where a model is a neural network, connection weights may be adjusted to reconcile differences between the neural network's prediction and the reference feedback. In a further use case, one or more neurons (or nodes) of the neural network may require that their respective errors be sent backward through the neural network to them in order to facilitate the update process (e.g., backpropagation of error). Updates to the connection weights may, for example, be reflective of the magnitude of error propagated backward after a forward pass has been completed. In this way, for example, the model may be trained to generate better predictions (e.g., recommendations).

In some embodiments, in order to provide this, the system may use an individual data point and an XGBoost algorithm to generate real-time predictions of the solution of a linear programming optimization. The system may first pull a full set of historical blockchain data and run linear programming solving on it to determine the optimal value for a given blockchain characteristic (e.g., indicia, bytecode, and/or bytecode representations required to ensure a given probability). The system may then use a reversely built XGBoost model to predict the optimal value for each of the data points given certain predictors. The advantage of this is that the system may achieve real-time scoring of incoming data points without the need to collect a full set of blockchain data.

Figure 2:
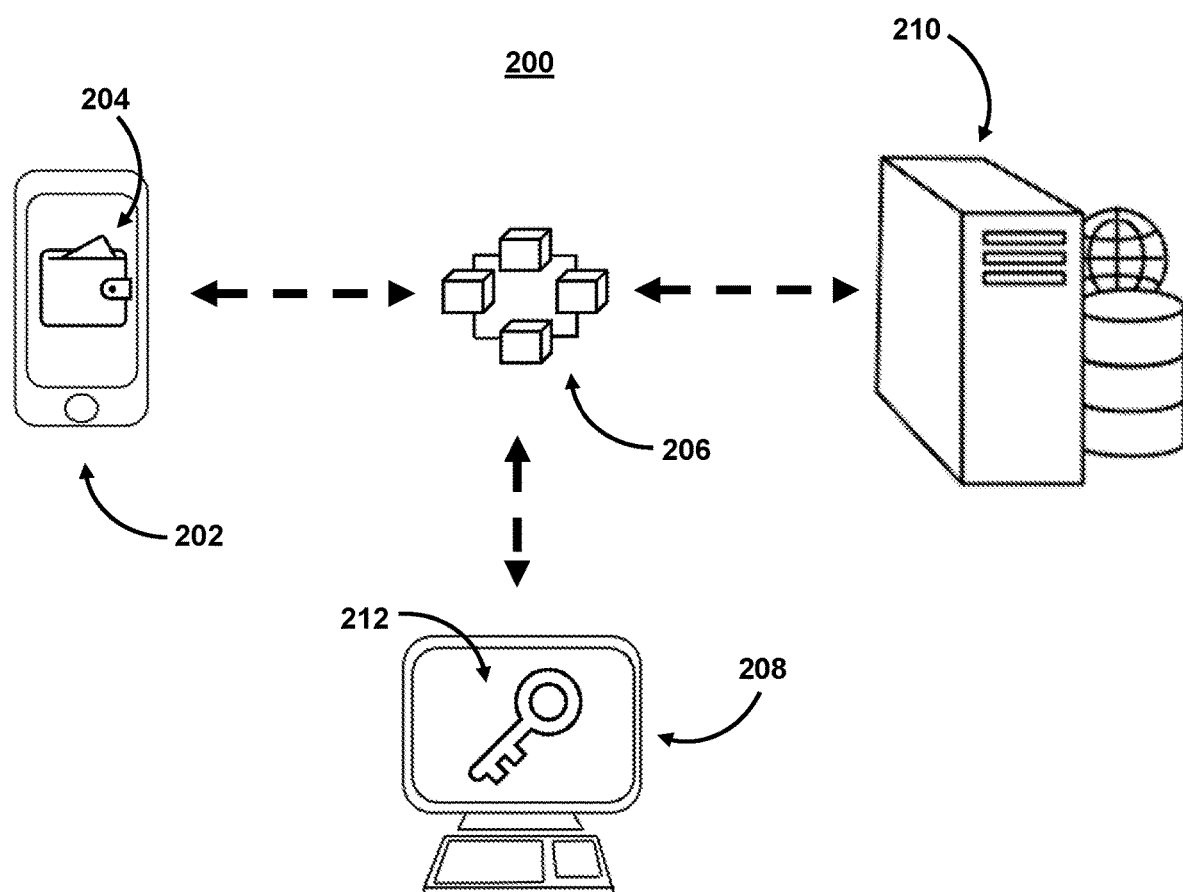
FIG. 2 shows an illustrative diagram for conducting blockchain operations, in accordance with one or more embodiments.

FIG. 2 shows an illustrative diagram for conducting blockchain operations, in accordance with one or more embodiments. For example, the diagram presents various components that may be used to facilitate blockchain operations in some embodiments. FIG. 2 includes user device 202. User device 202 may include a user interface. As referred to herein, a "user interface" may comprise a mechanism for human-computer interaction and communication in a device and may include display screens, keyboards, a mouse, and the appearance of a desktop. For example, a user interface may comprise a way a user interacts with an application or website in order to facilitate blockchain operations, and the user interface may display content related to blockchain operations. As referred to herein, "content" should be understood to mean an electronically consumable user asset, representations of goods or services (including nonfungible tokens), Internet content (e.g., streaming content, downloadable content, webcasts, etc.), video data, audio data, image data, and/or textual data, etc.

As shown in FIG. 2, system 200 may include multiple user devices (e.g., user device 202, user device 208, and/or user device 210). For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system.

It should be noted that, while shown as a smartphone, a personal computer, and a server in FIG. 2, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 200 performing a blockchain operation may equally be applied to, and correspond to, an individual user device (e.g., user device 202, user device 208, and/or user device 210) performing the blockchain operation. That is, system 200 may correspond to the user devices (e.g., user device 202, user device 208, and/or user device 210) collectively or individually.

Each of the user devices may be used by the system to conduct blockchain operations and/or contribute to indexing blockchain operations. As shown in FIG. 2, one or more user devices may include a digital wallet (e.g., digital wallet 204) used to perform blockchain operations. For example, the digital wallet may comprise a repository that allows users to store, manage, and trade their cryptocurrencies and assets, interact with blockchains, and/or conduct blockchain operations using one or more applications. The digital wallet may be specific to a given blockchain protocol or may provide access to multiple blockchain protocols. In some embodiments, the system may use various types of wallets such as hot wallets and cold wallets. Hot wallets are connected to the Internet, while cold wallets are not. Most digital wallet holders hold both a hot wallet and a cold wallet. Hot wallets are most often used to perform blockchain operations, while a cold wallet is generally used for managing a user account and may have no connection to the Internet.

As referred to herein, a cryptography-based digital repository or "a cryptography-based storage application" may refer to a digital wallet. A digital wallet may comprise a software-based system that securely (and typically in an encrypted format) stores a user's confidential information, personal information, payment information, and/or passwords for numerous payment methods and websites. By using a digital wallet, users can complete communications, purchases, and/or other blockchain operations easily and securely without risking the information becoming public or subject to a cyberattack. For example, the system may use the combination of a public key, a first partial key, and a second partial key to perform blockchain operations. For example, the system may use a user account that corresponds to an account for the blockchain platform service. For example, as opposed to a non-custodial cryptography-based storage application, which may correspond to a user without a third-party intermediary, the user account may correspond to a third-party intermediary (e.g., the platform service). By having a user account that corresponds to the platform service that is separate and distinct from a non-custodial, cryptography-based storage application, the system may provide additional features that would not be possible with conventional blockchain operations. For example, the system may augment and/or modify blockchain operations prior to completion in order to prevent fraud, verify user intent, and/or otherwise increase security. Additionally or alternatively, by having a user account that corresponds to the platform service that is separate and distinct from a non-custodial, cryptography-based storage application, the system may provide a single user access to multiple custodial, cryptography-based storage applications, using a single account for the platform service.

As shown in FIG. 2, one or more user devices may include a private key (e.g., key 212) and/or digital signature. For example, system 200 may use cryptographic systems for conducting blockchain operations. For example, system 200 may use public key cryptography, which features a pair of digital keys (e.g., which may comprise strings of data). In such cases, each pair comprises a public key (e.g., which may be public) and a private key (e.g., which may be kept private). System 200 may generate the key pairs using cryptographic algorithms (e.g., featuring one-way functions). System 200 may then encrypt a message (or other blockchain operation) using an intended receiver's public key such that the encrypted message may be decrypted only with the receiver's corresponding private key. In some embodiments, system 200 may combine a message with a private key to create a digital signature on the message. For example, the digital signature may be used to verify the authenticity of blockchain operations. As an illustration, when conducting blockchain operations, system 200 may use the digital signature to prove to every node in the system that it is authorized to conduct the blockchain operations.

For example, system 200 may comprise a plurality of nodes for the blockchain network. Each node may correspond to a user device (e.g., user device 208). A node for a blockchain network may comprise an application or other software that records and/or monitors peer connections to other nodes and/or miners for the blockchain network. For example, a miner comprises a node in a blockchain network that facilitates blockchain operations by verifying blockchain operations on the blockchain, adding new blocks to the existing chain, and/or ensuring that these additions are accurate. The nodes may continually record the state of the blockchain and respond to remote procedure requests for information about the blockchain.

For example, user device 208 may request a blockchain operation (e.g., conduct a transaction). The blockchain operation may be authenticated by user device 208 and/or another node (e.g., a user device in the community network of system 200). For example, using cryptographic keys, system 200 may identify users and give access to their respective user accounts (e.g., corresponding digital wallets) within system 200. Using private keys (e.g., known only to the respective users) and public keys (e.g., known to the community network), system 200 may create digital signatures to authenticate the users.

Following an authentication of the blockchain operation (e.g., using key 212), the blockchain operation may be authorized. For example, after the blockchain operation is authenticated between the users, system 200 may authorize the blockchain operation prior to adding it to the blockchain. System 200 may add the blockchain operation to blockchain 206. System 200 may perform this based on a consensus of the user devices within system 200. For example, system 200 may rely on a majority (or other metric) of the nodes in the community network (e.g., user device 202, user device 208, and/or user device 210) to determine that the blockchain operation is valid. In response to validation of the block, a node user device (e.g., user device 202, user device 208, and/or user device 210) in the community network (e.g., a miner) may receive a reward (e.g., in a given cryptocurrency) as an incentive for validating the block.

To validate the blockchain operation, system 200 may use one or more validation protocols and/or validation mechanisms. For example, system 200 may use a proof-of-work mechanism in which a user device must provide evidence that it performed computational work to validate a blockchain operation, and thus, this mechanism provides a manner for achieving consensus in a decentralized manner, as well as preventing fraudulent validations. For example, the proof-of-work mechanism may involve iterations of a hashing algorithm. The user device that is successful aggregates and records blockchain operations from a mempool (e.g., a collection of all valid blockchain operations waiting to be confirmed by the blockchain network) into the next block. Alternatively, or additionally, system 200 may use a proof-of-stake mechanism in which a user account (e.g., corresponding to a node on the blockchain network) is required to have, or "stake," a predetermined amount of tokens in order for system 200 to recognize it as a validator in the blockchain network.

In response to validation of the block, the block is added to blockchain 206, and the blockchain operation is completed. For example, to add the blockchain operation to blockchain 206, the successful node (e.g., the successful miner) encapsulates the blockchain operation in a new block before transmitting the block throughout system 200.

Figure 3:
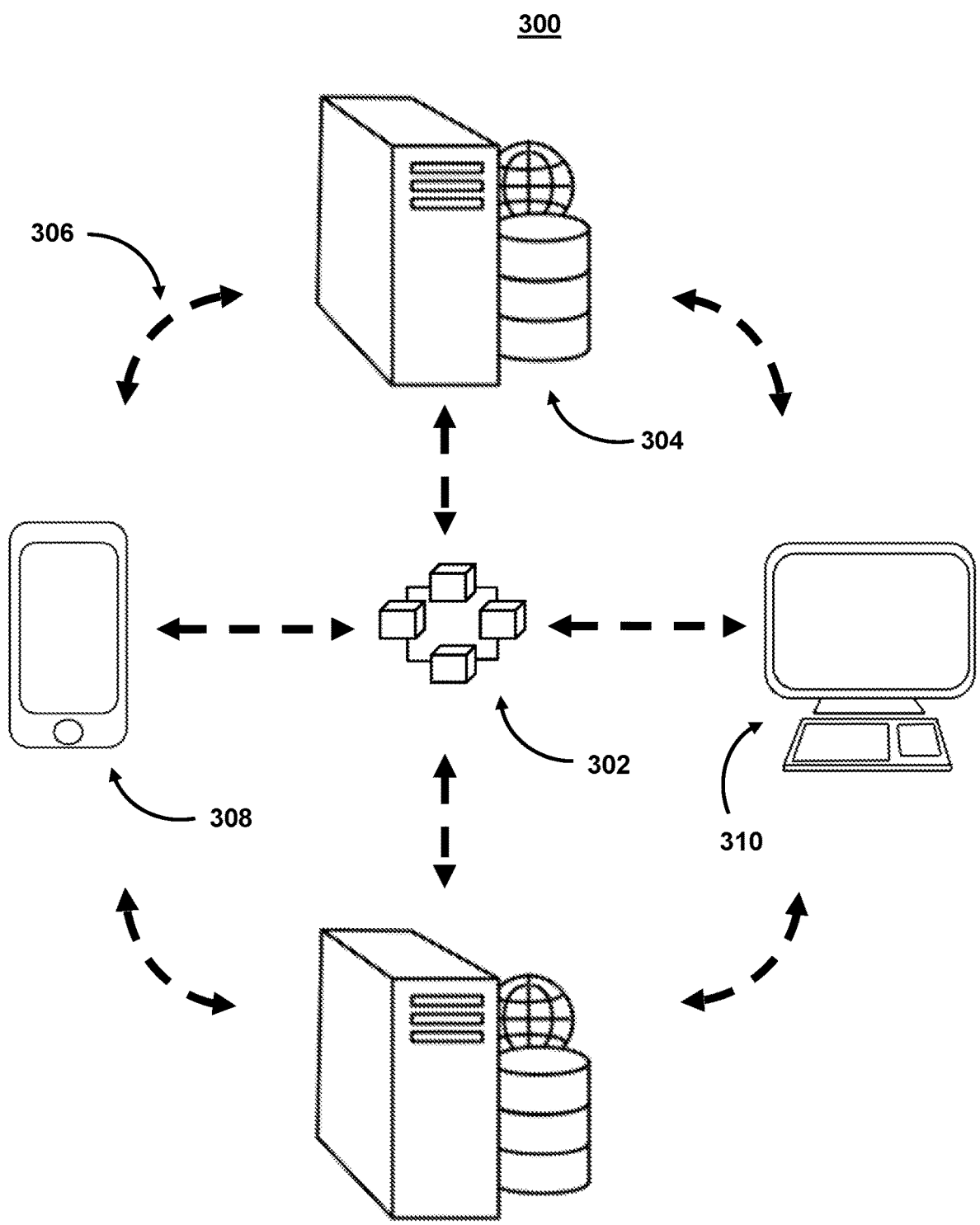
FIG. 3 shows an illustrative diagram for a decentralized application, in accordance with one or more embodiments.

FIG. 3 shows an illustrative diagram for a decentralized application, in accordance with one or more embodiments. For example, in some embodiments, system 300 may facilitate blockchain operations within a decentralized application environment. A decentralized application may comprise an application that exists on a blockchain (e.g., blockchain 302) and/or a peer-to-peer network (e.g., network 306). That is, a decentralized application may comprise an application that has a back end that is in part powered by a decentralized peer-to-peer network such as a decentralized, open-source blockchain with smart contract functionality.

For example, network 306 may allow user devices (e.g., user device 304) within network 306 to share files and access. In particular, the peer-to-peer architecture of network 306 allows blockchain operations (e.g., corresponding to blockchain 302) to be conducted between the user devices in the network, without the need of any intermediaries or central authorities.

In some embodiments, the user devices of system 300 may comprise one or more cloud components. For example, cloud components may be implemented as a cloud computing system and may feature one or more component devices. It should also be noted that system 300 is not limited to four devices. Users may, for instance, utilize one or more devices to interact with one another, one or more servers, or other components of system 300. It should be further noted that while one or more operations (e.g., blockchain operations) are described herein as being performed by a particular component (e.g., user device 304) of system 300, those operations may, in some embodiments, be performed by other components of system 300. As an example, while one or more operations are described herein as being performed by components of user device 304, those operations may, in some embodiments, be performed by one or more cloud components. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components (e.g., user device 304 and user device 308, respectively). Additionally, or alternatively, a single user (and/or a user account linked to a single user) may interact with system 300 and/or one or more components of system 300 using two different components (e.g., user device 304 and user device 308, respectively).

With respect to the components of system 300, each of these devices may receive content and data via input/output (hereinafter "I/O") paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both user device 308 and user device 310 include a display upon which to display data (e.g., content related to one or more blockchain operations).

Additionally, the devices in system 300 may run an application (or another suitable program). The application may cause the processors and/or control circuitry to perform operations related to blockchain operations within a decentralized application environment.

Each of these devices may also include electronic storages. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes network 306, which may comprise communication paths between user devices. The communication paths may include the Internet, a mobile phone network, a mobile voice or data network (e.g., a 5G or LTE "Long-Term Evolution" network), a cable network, a public switched telephone network, or other types of communications networks or combinations of communication networks. The communication paths may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 4:
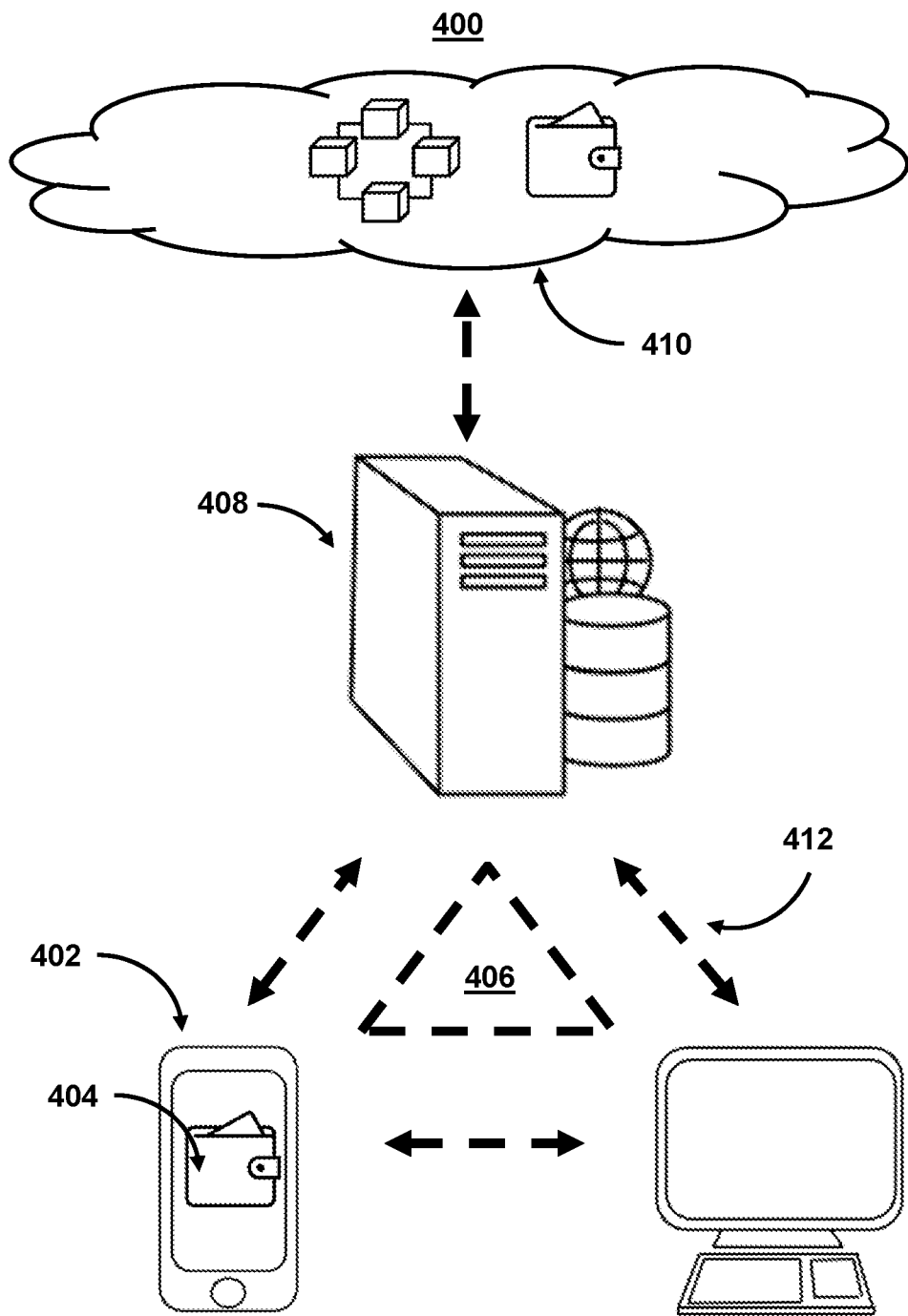
FIG. 4 shows an illustrative diagram for conducting operations in a decentralized application using blockchain operations, in accordance with one or more embodiments.

FIG. 4 shows an illustrative diagram for conducting operations in a decentralized application using blockchain operations, in accordance with one or more embodiments. For example, system 400 may include user device 402. Furthermore, user device 402 may comprise an application (e.g., application 404) that is implemented on, and/or accessible by, user device 402. For example, application 404 may interact with one or more other applications and/or application programming interfaces (APIs) in order to facilitate blockchain operations. For example, application 404 may comprise a decentralized application digital wallet and/or wallet service that is able to sign and send transactions to transfer tokens and/or perform other blockchain operations, as well as interact with one or more decentralized applications.

System 400 also includes API layer 406. In some embodiments, API layer 406 may be implemented on user device 402. Alternatively, or additionally, API layer 406 may reside on one or more cloud components (e.g., server 408). For example, API layer 406 may reside on a server 408 and comprise a platform service for a custodial wallet service, decentralized application, etc. API layer 406 (which may be a REST or web services API layer) may provide a decoupled interface to data and/or functionality of one or more applications.

API layer 406 may provide various low-level and/or blockchain-specific operations in order to facilitate blockchain operations. For example, API layer 406 may provide blockchain operations such as blockchain writes. Furthermore, API layer 406 may perform a transfer validation ahead of forwarding the blockchain operation (e.g., a transaction) to another service (e.g., a crypto service). API layer 406 may then log the outcome. For example, by logging to the blockchain prior to forwarding, the API layer 406 may maintain internal records and balances without relying on external verification (e.g., which may take up to ten minutes based on blockchain updating activity).

API layer 406 may also provide informational reads. For example, API layer 406 (or a platform service powered by API layer 406) may generate blockchain operation logs and write to an additional ledger (e.g., an internal record and/or indexer service) the outcome of the reads. If this is done, a user accessing the information through other means may see consistent information such that downstream users ingest the same data point as the user.

API layer 406 may also provide a unified API to access balances, transaction histories, and/or other blockchain operations activity records between one or more decentralized applications and custodial user accounts. By doing so, the system maintains the security of sensitive information such as the balances and transaction history. Alternatively, a mechanism for maintaining such security would separate the API access between the decentralized applications and custodial user accounts through the use of special logic. The introduction of the special logic decreases the streamlining of the system, which may result in system errors based on divergence and reconciliation.

API layer 406 may provide a common, language-agnostic way of interacting with an application. In some embodiments, API layer 406 may comprise a web services API that offers a well-defined contract that describes the services in terms of their operations and the data types used to exchange information. REST (Representational state transfer) APIs do not typically have this contract; instead, they are documented with client libraries for most common languages including Ruby, Java, PHP, and JavaScript. SOAP (Simple Object Access Protocol) web services have traditionally been adopted in the enterprise for publishing internal services, as well as for exchanging information with partners in business-to-business (B2B) transactions.

API layer 406 may use various architectural arrangements. For example, system 400 may be partially based on API layer 406, such that there is strong adoption of SOAP and RESTful web services, using resources such as Service Repository and Developer Portal, but with low governance, standardization, and separation of concerns. Alternatively, system 400 may be fully based on API layer 406, such that separation of concerns between layers such as API layer 406, services, and applications are in place.

In some embodiments, the system architecture may use a microservice approach. Such systems may use two types of layers: front-end layers and back-end layers, where microservices reside. In this kind of architecture, the role of the API layer 406 may be to provide integration between front-end and back-end layers. In such cases, API layer 406 may use RESTful APIs (exposition to front-end or even communication between microservices). API layer 406 may use the Advanced Message Queuing Protocol (AMQP), which is an open standard for passing business messages between applications or organizations. API layer 406 may use an open-source, high-performance remote procedure call (RPC) framework that may run in a decentralized application environment. In some embodiments, the system architecture may use an open API approach. In such cases, API layer 406 may use commercial or open-source API platforms and their modules. API layer 406 may use a developer portal. API layer 406 may use strong security constraints applying a web application firewall that protects the decentralized applications and/or API layer 406 against common web exploits, bots, and denial-of-service (DDoS) attacks. API layer 406 may use RESTful APIs as standard for external integration.

As shown in FIG. 4, system 400 may use API layer 406 to communicate with and/or facilitate blockchain operations with server 408. For example, server 408 may represent a custodial platform for blockchain operations. A custodial platform may manage private keys stored by a centralized service provider (e.g., server 408). In such cases, server 408 may interact with blockchain 410, a wallet service for blockchain 410, an indexer service for blockchain 410 (e.g., as described in FIG. 5), and/or other platform services.

For example, a wallet service may comprise an application and/or a software-based system that securely stores users' payment information, private keys, and/or passwords facilitating blockchain operations with websites, nodes, and/or other devices. In some embodiments, a wallet service may also provide additional ledger access (e.g., a second ledger). Furthermore, as discussed above, this second ledger may receive updates directly from API layer 406, as opposed to relying on data pulled directly from blockchain 410.

For example, system 400 may maintain its records (e.g., both live and for accounting) in good order separate from balances on blockchain 410. That is, system 400 may maintain an architecture featuring the second ledger, where balances are stored and updated, and the logs of blockchain operations. While conventional systems may rely on directly referencing blockchain 410, since the blockchain is the source of truth for the system, however, such reliance leads to additional technical problems.

First, there is a strong likelihood of impedance mismatch between a format for a platform service and the APIs used to retrieve data from the blockchain (e.g., which may lead to accounting imbalances). For example, system 400 may need to be able to generate accounting entries reflecting changes of balances. However, while changes of balances can be tracked by examining blockchain 410, this requires additional processing and computational power.

Second, accounting changes in a blockchain architecture should be irreversible. This is achieved in practice for current blockchain operations by waiting for a variable number of confirmations from the blockchain (e.g., blockchain 410). By waiting for the variable number of confirmations, the likelihood of an error in the blockchain becomes infinitesimally small. However, while blockchain services rely on this methodology, this is not a rule inherent to the blockchain itself. That is, the blockchain does not have an inherent authentication mechanism that is dependent on a number of confirmations. Instead, the blockchain relies on an absolute system— blockchain operations are either recorded on a particular node or they are not.

As such, forks in the blockchain are always possible. In the case of a fork, system 400 may not follow the "right" fork for an undetermined amount of time. If that happens, and if, for the purpose of a custodial digital wallet, system 400 decides to move from one fork to another, system 400 may have a more straightforward mechanism to maintain an accurate history of a user account's positions if system 400 stores them independently from a given blockchain. Furthermore, in case of forks, system 400 performs some internal remediation on user accounts, which is enabled by system 400 maintaining a layer of insulation from the blockchain for remedial blockchain operations. For example, system 400 may have a separate storage, protected by the second ledger (e.g., a ledger service), for reads, and by a transfer service, for writes, that reflect the state of the blockchain that is relevant for system 400 purposes.

Figure 5:
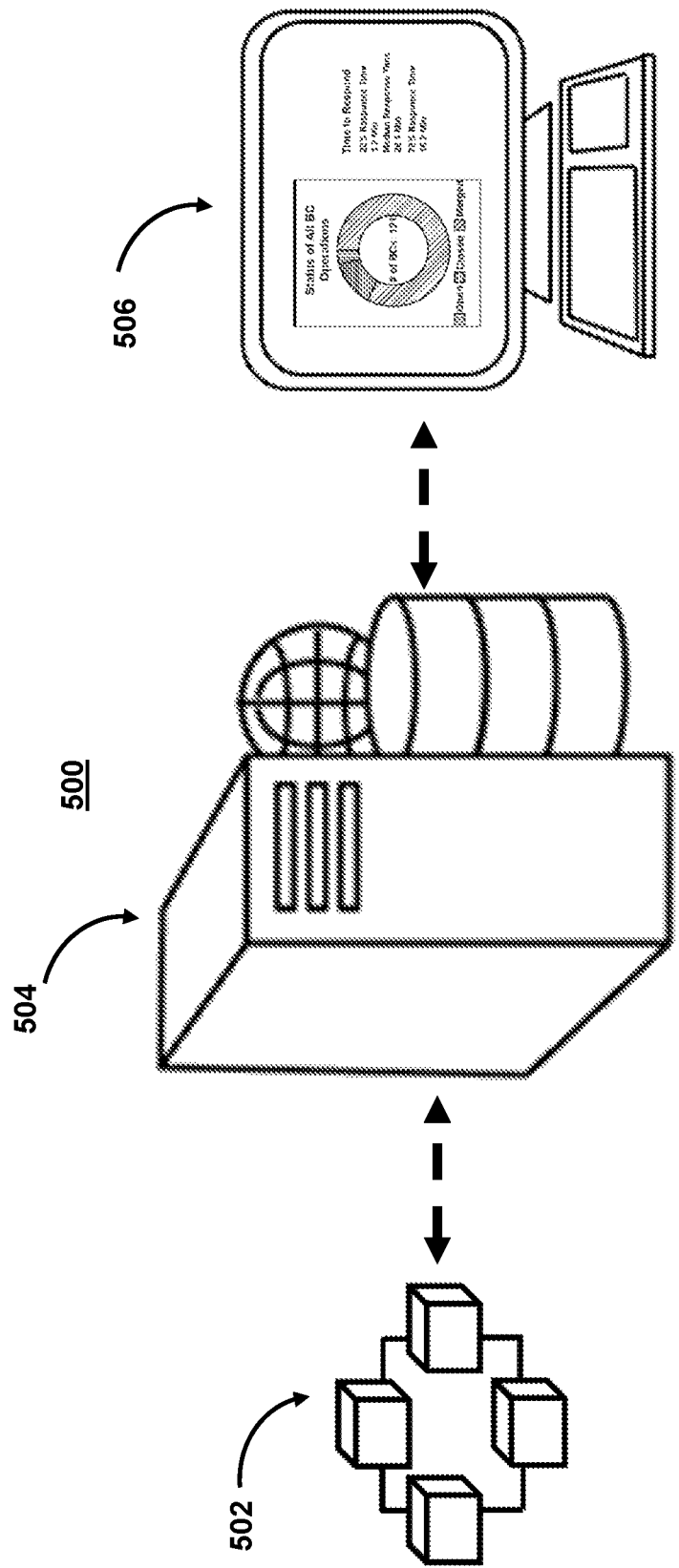
FIG. 5 shows an illustrative diagram for a blockchain indexer, in accordance with one or more embodiments.

FIG. 5 shows an illustrative diagram for a blockchain indexer, in accordance with one or more embodiments. For example, in some embodiments, the system may use indexer service 500 to facilitate blockchain operations. Indexer service 500 may fetch raw data (e.g., data related to a current state and/or instance of blockchain 502) from a node of a blockchain network (e.g., as described above). Indexer service 500 may then process the data and store it in a database and/or data structure in an efficient way to provide quick access to the data. For example, indexer 504 may publish and/or record a subset of blockchain operations that occur for blockchain 502. Accordingly, for subsequent blockchain operations, indexer service 500 may reference the index at indexer 504 as opposed to a node of blockchain 502 to provide various services at user device 506.

For example, indexer 504 may store a predetermined list of blockchain operations to monitor for and/or record in an index. These may include blockchain operations (e.g., "operation included," "operation removed," "operation finalized") related to a given type of blockchain operation (e.g., "transaction," "external transfer," internal transfer," "new contract metadata," "ownership change," etc.), as well as blockchain operations related to a given protocol, protocol subgroup, and/or other characteristic (e.g., "ETH," "ERC20," and/or "ERC721"). Additionally, and/or alternatively, the various blockchain operations and metadata related to those blockchain operations (e.g., block designations, user accounts, time stamps, etc.), as well as an aggregate of multiple blockchain operations (e.g., total blockchain operations amounts, rate of blockchain operations, rate of blockchain updates, etc.) may be monitored and/or recorded.

Indexer 504 may likewise provide navigation and search features (e.g., support Boolean operations) for the indexed blockchain operations. In some embodiments, indexer 504 may apply one or more formatting protocols to generate representations of indexed blockchain operations in a human readable format. In some embodiments, indexer 504 may also tag blockchain operations based on whether or not the blockchain operation originated for a local user account (e.g., a user account corresponding to a custodial account) and/or a locally hosted digital wallet. Indexer service 500 may determine whether a blockchain operation contains relevant information for users of indexer service 500 by storing information about whether an address is an internal address of indexer service 500 or one used in a digital wallet hosted by a predetermined wallet service.

Figure 6:
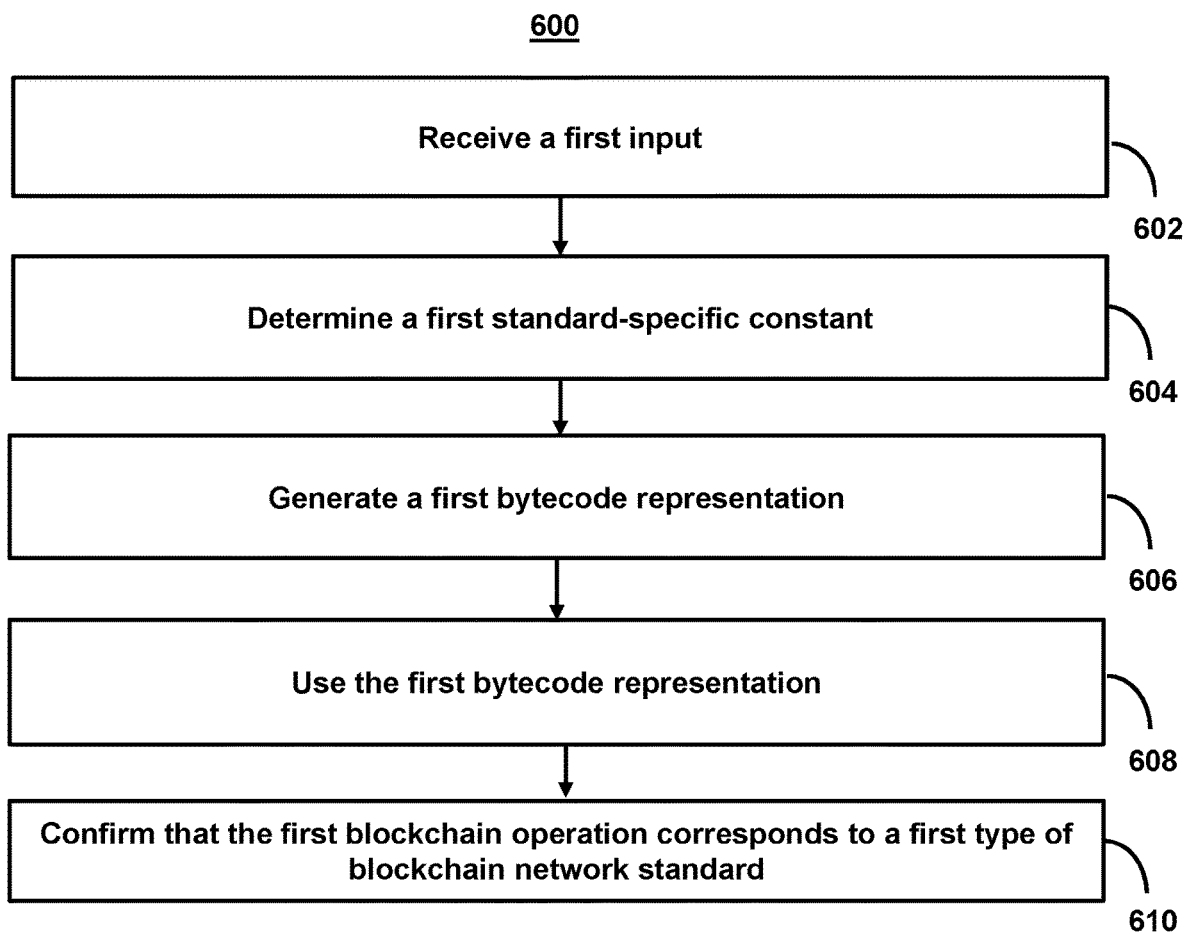
FIG. 6 shows a flowchart of the steps involved in selectively indexing blockchain operations, in accordance with one or more embodiments.

FIG. 6 shows a flowchart of the steps involved selectively indexing blockchain operations, in accordance with one or more embodiments. For example, the system may use process 600 (e.g., as implemented on one or more system components described above) in order to selectively index blockchain operations by parsing raw blockchain data for relevant smart contracts prior to executing confirmatory function calls.

At step 602, process 600 (e.g., using one or more components described above) receives a first input. For example, the system may receive a first input, wherein the first input indicates a first type of blockchain network standard of a plurality of types of blockchain network standards for detection. In some embodiments, the first input may comprise a first user input (e.g., an input received by the system in response to a direct or indirect user action). For example, the system may receive a contract address corresponding to a blockchain operation.

In some embodiments, the first input may comprise a known contract address, and parsing the first bytecode sample may further comprise determining a second probability that the first blockchain operation corresponds to the known contract address. For example, in some embodiments, the system may receive a user request to identify a blockchain operation corresponding to multiple criteria, such as a blockchain network standard type, a type of blockchain operation, and/or a particular contract address.

At step 604, process 600 (e.g., using one or more components described above) determine a first standard-specific constant. For example, the system may, in response to receiving the first input, determine a first standard-specific constant corresponding to the first type of blockchain network standard. As one example, the system may determine constant corresponding to a specific standard (e.g., ENCODED_ERC20_DECIMALS).

In some embodiments, the standard-specific constant may comprise a compiling of an indicium of a plurality of indicia of bytecode representations that correspond to a first type of blockchain network standard of a blockchain network. For example, the indicium may be based on stand-specific private constants that routinely appear in bytecode corresponding to the type of blockchain network standard. For example, the plurality of indicia are based on the system retrieving a plurality of bytecode samples corresponding to the first type of blockchain network standard of the blockchain network. The system may then parse the plurality of bytecode samples to identify the plurality of indicia of bytecode representations that correspond to the first type of blockchain network standard. The system may generate compilings or decompilings of the standard-specific constant to generate an indicium.

In some embodiments, the standard-specific constant may comprise compile-time values, which do not change after being compiled. For example, the system may generate compilings or decompilings of the standard-specific constant to generate an indicium. The indicium may then be used to identify bytecode representations in runtime bytecode.

In some embodiments, determining the first standard-specific constant corresponding to the first type of blockchain network standard further comprises the system accessing the blockchain node. The system may then retrieve a plurality of runtime bytecode samples from blocks on the blockchain node, wherein the plurality of runtime bytecode samples comprises non-human readable text. The system may extract the plurality of bytecode samples from the plurality of runtime bytecode samples. The system may then determine the first standard-specific constant based on the plurality of bytecode samples.

For example, the system may determine the standard-specific constant based on parsing samples of bytecode know to correspond to the type of blockchain network standard. To generate the bytecode samples and/or bytecode representations described herein, the system may use an EVM decompiler to extract information from runtime bytecode and present it in a more human readable form. For example, runtime bytecode samples may comprise machine code that is not human readable. The system may in turn use a decompiler (e.g., Solidity) to format portions of the runtime bytecode samples into human readable text. Additionally, or alternatively, the system may generate the bytecode samples and/or bytecode representations directly from runtime bytecode (e.g., without first decompiling).

At step 606, process 600 (e.g., using one or more components described above) generates a first bytecode representation. For example, the system may generate a first bytecode representation of the first standard-specific constant. For example, the system may use an abi.encodeWithSignature function to generate a constant, which generates a byte code output of the desired method (e.g., decimals( ).

In some embodiments, generating the first bytecode representation may comprise the system determining a first combination of characters in the plurality of bytecode samples in a threshold number of the plurality of bytecode sample and assigning the first combination of characters as the first bytecode representation. For example, the system may generate the first bytecode representation by parsing a plurality of bytecode samples to identify a combination of characters (e.g., alphanumeric characters in a given order) to identify the sample that corresponds to the standard-specific constant. For example, a standard-specific constant (e.g., when compiled or decompiled) may result in recurring combinations of characters. These recurring combinations may be used to identify the blockchain network standard types from the plurality of types of blockchain network standards.

In some embodiments, generating the first bytecode representation may comprise the system mapping portions of the plurality of bytecode samples, locating a first portion of the plurality of portions, and parsing the first portion to determine the first combination of characters. For example, the system may parse the plurality of bytecode samples to identify a portion of the sample in which a combination of characters (e.g., alphanumeric characters in a given order) identify that the sample corresponds to the first type of blockchain network standard. For example, a type of blockchain network standard may result in recurring combinations of characters and/or may result in that combination appearing at a given location. These recurring combinations and/or at a given location may be used to identify the blockchain network standard types from the plurality of types of blockchain network standards.

In some embodiments, assigning the first combination of characters as the first bytecode representation may comprise the system generating a record for the first bytecode representation, adding the first combination of characters to the record, and adding a location of the first portion to the record. For example, the system may generate a plurality of bytecode representations and may store each of the bytecode representations along with information about the specific bytecode representation to which they correspond, a type of blockchain network standard to which they correspond, and/or a blockchain operation. The system may store this information along with information about the bytecode representation (e.g., a likely location of the bytecode representation) in a record.

At step 608, process 600 (e.g., using one or more components described above) may use the first bytecode representation. For example, the system may use the first bytecode representation to determine whether a first blockchain operation corresponds to the first type of blockchain network standard. For example, the system may retrieve a first bytecode sample. For example, the system may retrieve a first bytecode sample corresponding to a first block of a blockchain network. For example, the system may extract bytecode from a block via a blockchain node. The system may (e.g., using one or more components described above) parses the first bytecode sample to determine a first probability. For example, the system may parse the first bytecode sample using the first bytecode representation to determine a first probability that the first block comprises a first blockchain operation corresponding to the first type of blockchain network standard. The system may (e.g., using one or more components described above) compare the first probability to a threshold probability. For example, the system may compare the first probability to a threshold probability. The system may then determine (e.g., within a given confidence level) whether or not the first bytecode representation corresponds to the first type of blockchain network standard. In some embodiments, the system may determine the first standard-specific constant, indicia, and/or blockchain representations (or probability thereof) corresponding to the first type of blockchain network standard further using a machine learning model trained using labeled standard-specific constants, indicia, and/or blockchain representations corresponding to the first type of blockchain network standard to detect the first standard-specific constant, indicia, and/or blockchain representations.

At step 610, process 600 (e.g., using one or more components described above) confirms that the first blockchain operation corresponds to a first type of blockchain network standard. For example, the system may execute a first function on the first input to confirm that the first blockchain operation corresponds to the first type of blockchain network standard. For example, the system may, in response, determine that the first probability equals or exceeds the threshold probability, and execute a first function on the first input to confirm that the first blockchain operation corresponds to the first type of blockchain network standard. For example, the system may perform a STATICCALL function on the contract address.

In some embodiments, the first function comprises a function with a value argument that is zero. For example, within the EVM, STATICCALL functions equivalently to a CALL, with the exception that STATICCALL takes only six arguments, as the "value" argument is not included and taken to be zero. The function calls the child with the STATIC flag set to true for the execution of the child. Once this call returns, the flag is reset to its value before the call. As such, STATICCALL functions similar to CALL, but will revert if the called function modifies the state in any way. Thus, STATICCALL functions present lower processing and resource costs.

In some embodiments, executing the first function comprises the system accessing an application binary interface and causing the application binary interface to execute a STATICCALL opcode in the EVM. For example, STATICCALL is a variant of CALL that permits only non-state-changing calls to other contracts (including itself). Any opcode that performs modifications to the state results in an exception instead of performing the modification. For example, using STATICCALL, the system may call a function while disallowing any state change operation. If a contract depends only on reading data from another contract, the system can safely assume that a conflicting state change will not be triggered.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

Figure 7:
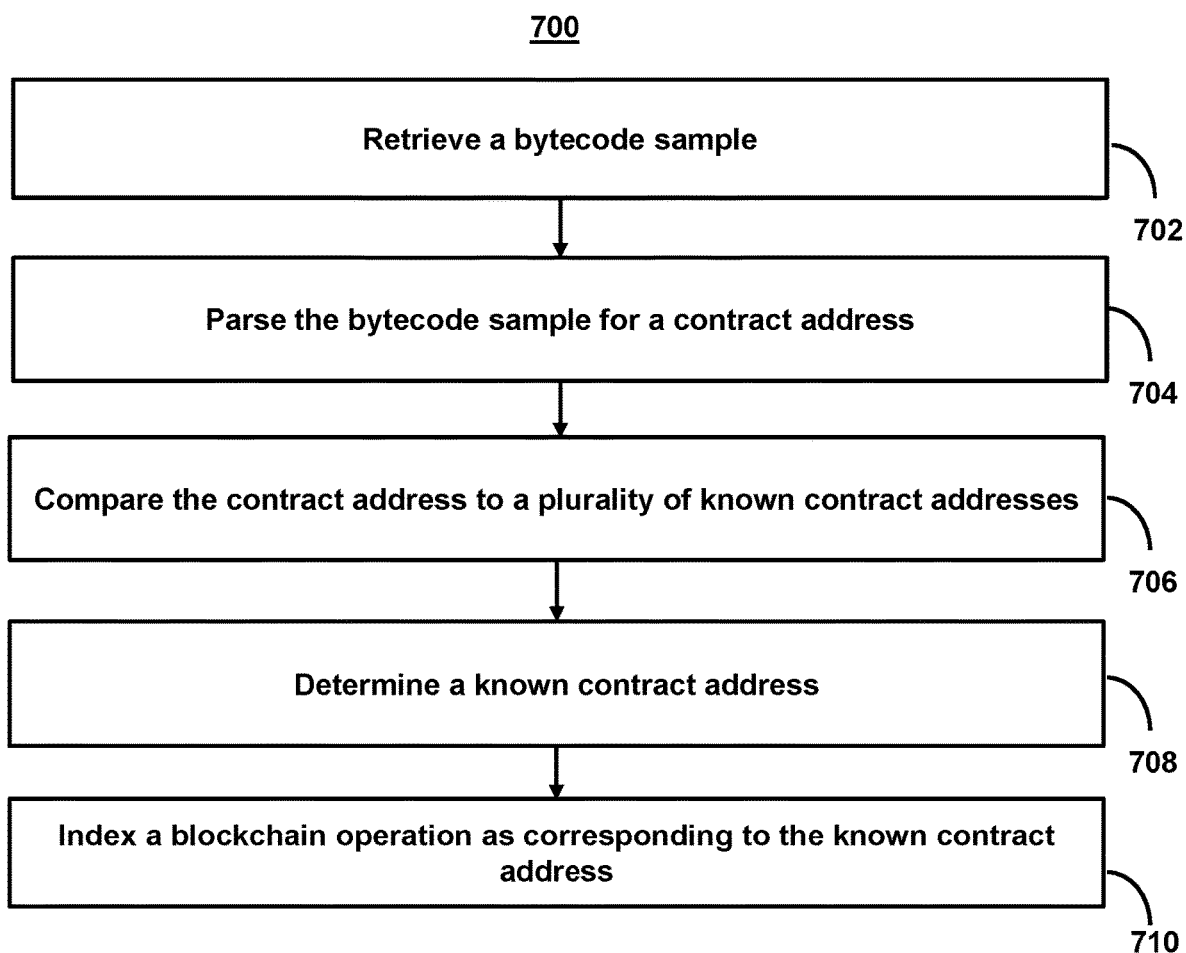
FIG. 7 shows a flowchart of the steps involved in indexing blockchain operations, in accordance with one or more embodiments.

FIG. 7 shows a flowchart of the steps involved in indexing blockchain operations, in accordance with one or more embodiments. For example, the system may use process 700 (e.g., as implemented on one or more system components described above) in order to index blockchain operations based on identifying unindexed parameters and other information in raw blockchain data samples.

At step 702, process 700 (e.g., using one or more components described above) retrieves a bytecode sample. For example, the system may retrieve a first bytecode sample corresponding to a first blockchain operation in a first block of a blockchain network. For example, the system may retrieve bytecode and segregate the bytecode into portions. The system may then segregate the bytecode into constructor arguments, code sections, and/or metadata. The system may then parse the segregated portions of bytecode for bytecode representations that are based on function signatures, event signatures, token standards, and/or contract addresses.

At step 704, process 700 (e.g., using one or more components described above) parses the bytecode sample for a contract address. For example, the system may parse the first bytecode sample to identify a first bytecode representation corresponding to a first contract address. In some embodiments, parsing the first bytecode sample may comprise the system segregating portions of first bytecode samples and parsing the portions for bytecode representations.

In some embodiments, parsing the first bytecode sample to identify the first bytecode representation corresponding to the first contract address may comprise the system accessing a blockchain node, retrieving a runtime bytecode sample from a block on the blockchain node, wherein the runtime bytecode sample comprises non-human readable text, and extracting the first bytecode sample from the runtime bytecode sample. For example, to generate the bytecode samples and/or bytecode representations described herein, the system may use an EVM decompiler to extract information from runtime bytecode and present it in a more human readable form. For example, runtime bytecode samples may comprise machine code that is not human readable. The system may in turn use a decompiler (e.g., Solidity) to format portions of the runtime bytecode samples into human readable text. Additionally, or alternatively, the system may generate the bytecode samples and/or bytecode representations directly from runtime bytecode (e.g., without first decompiling).

In some embodiments, by parsing the first bytecode sample to identify the first bytecode representation corresponding to the first contract address, the system may determine a probability that the first bytecode representation corresponds to a potential contract address and compare the probability to a threshold probability. For example, when generating a bytecode representation that corresponds to a potential contract address, the system may further determine probability that the bytecode representation corresponds to a potential address (and/or only one potential address). The system may perform this by determining that only bytecode samples above a certain percentile contain the bytecode representation. By doing so, the system may limit false positive detections of new contract addresses.

In some embodiments, the system may use the first standard-specific constant, indicia, and/or blockchain representations corresponding to the first type of blockchain network standard, further using a machine learning model trained using labeled standard-specific constants, indicia, and/or blockchain representations corresponding to the first type of blockchain network standard to detect the first standard-specific constant, indicia, and/or blockchain representations.

At step 706, process 700 (e.g., using one or more components described above) compares the contract address to a plurality of known contract addresses. For example, the system may, in response to identifying the first bytecode representation, compare the first contract address to a plurality of known contract addresses to determine whether the first contract address is included in the plurality of known contract addresses.

In some embodiments, generating the first bytecode representation may comprise the system determining a first combination of characters in the plurality of bytecode samples in a threshold number of a plurality of bytecode samples corresponding to the first known contract address and assigning the first combination of characters as the first bytecode representation. For example, the system may generate the first bytecode representation by parsing a plurality of bytecode samples labeled as corresponding to the first known contract address to identify a combination of characters (e.g., alphanumeric characters in a given order) to identify the sample that corresponds to the standard-specific constant. For example, blockchain operations from a particular contract address (e.g., when compiled or decompiled) may result in recurring combinations of characters. These recurring combinations may be used to identify the contract address.

In some embodiments, generating the first bytecode representation may further comprise the system mapping portions of the plurality of bytecode samples, locating a first portion of the first bytecode sample and parsing the first portion to determine the first combination of characters. For example, the system may parse the plurality of bytecode samples to identify a portion of the sample in which a combination of characters (e.g., alphanumeric characters in a given order) identify the contract address. For example, a blockchain operation from a contract address may result in recurring combinations of characters and/or may result in that combination appearing at a given location. These recurring combinations and/or at a given location may be used to identify the contract address.

In some embodiments, assigning the first combination of characters as the first bytecode representation may further comprise the system generating a record for the first bytecode representation, adding the first combination of characters to the record, and adding a location of the first portion to the record. For example, the system may generate a plurality of bytecode representations and may store each of the bytecode representations along with information about the specific contract address to which they correspond, a type of blockchain network standard to which they correspond, and/or a blockchain operation. The system may store this information along with information about the bytecode representation in a record.

At step 708, process 700 (e.g., using one or more components described above) determines a known contract address. For example, the system may, in response to determining that the first contract address is included in the plurality of known contract addresses, retrieve a first known contract address for the first contract address. Additionally or alternatively, the system may determine a first known contract address of the plurality of known contract addresses corresponds to the first contract address.

At step 710, process 700 (e.g., using one or more components described above) indexes a blockchain operation as corresponding to the known contract address. For example, the system may index, using an indexing application, the first block by recording the first blockchain operation as corresponding to the first known contract address. Additionally or alternatively, the system may index, using an indexing application, at least a portion of the first block by recording data corresponding to the first blockchain operation as corresponding to the first known contract address. For example, the data corresponding to the first blockchain operation may include a smart contract (and data related thereto) involved in the blockchain operation.

For example, the system may catalog and/or index known contract addresses. If the system detects a contract address that is not known, the system may generate a new known contract address. In such cases, the system may retrieve a second bytecode sample corresponding to a second blockchain operation in the first block of the blockchain network. The system may parse the second bytecode sample to identify a second bytecode representation corresponding to a second contract address. In response to identifying the second bytecode representation, the system may compare the second contract address to the plurality of known contract addresses to determine whether the second contract address is included in the plurality of known contract addresses. In response to determining that the second contract address is not included in the plurality of known contract addresses, the system may generate a new known contract address for inclusion in the plurality of known contract addresses. The system may further index, using the indexing application, the first block by recording the second blockchain operation as corresponding to the new known contract address.

When generating the new known contract address for inclusion in the plurality of known contract addresses, the system may generate a second record for the new known contract address, add the second bytecode representation to the second record, and add a second contract address to the second record. For example, when the system generates the plurality of known contract addresses, the system may store the contract address with information about the specific bytecode representation to which they correspond, the entity to which they correspond, a type of blockchain network standard to which they correspond, and/or a blockchain operation involving the contract address. The system may store this information in a record, along with information about the known contract addresses.

In some embodiments, indexing the first block by recording the first blockchain operation as corresponding to the first known contract address may comprise the system retrieving a first record for the first known contract address and adding the first blockchain operation to the first record. For example, when the system indexes blockchain operations corresponding to the plurality of known contract addresses, the system may store the contract address with information about the specific bytecode representation to which they correspond, the entity to which they correspond, a type of blockchain network standard to which they correspond, and/or a blockchain operation involving the contract address. The system may store this information along with information about the known contract addresses in a record of an indexing application.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

Figure 8:
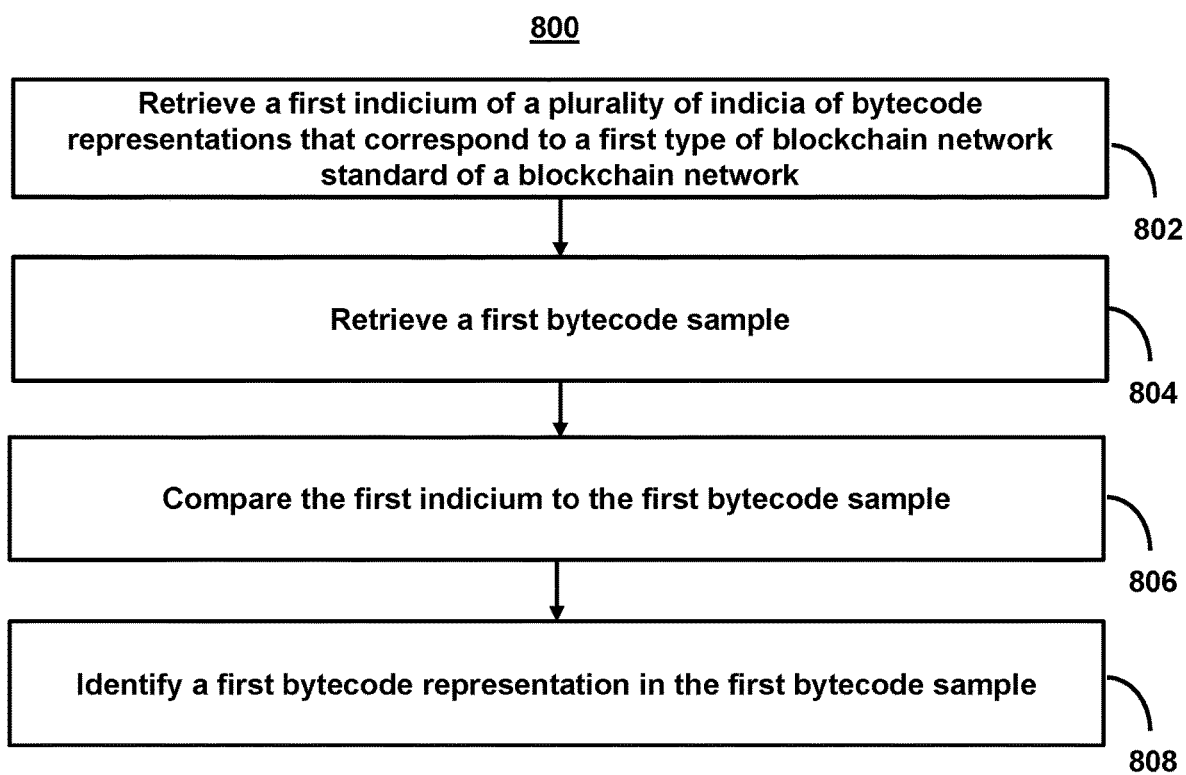
FIG. 8 shows a flowchart of the steps involved in generating bytecode representations, in accordance with one or more embodiments.

FIG. 8 shows a flowchart of the steps involved in generating bytecode representations, in accordance with one or more embodiments. For example, the system may use process 800 (e.g., as implemented on one or more system components described above) in order to generate bytecode representations used to identify unindexed parameters and other information in raw blockchain data.

At step 802, process 800 (e.g., using one or more components described above) retrieves a first indicium of a plurality of indicia of bytecode representations that correspond to a first type of blockchain network standard of a blockchain network. For example, the system may retrieve a first indicium of a plurality of indicia of bytecode representations that correspond to a first type of blockchain network standard of a blockchain network. In some embodiments, the plurality of indicia may be based on: retrieving a plurality of bytecode samples corresponding to the first type of blockchain network standard of the blockchain network; and parsing the plurality of bytecode samples to identify the plurality of indicia of bytecode representations that correspond to the first type of blockchain network standard.

In some embodiments, parsing the plurality of bytecode samples to identify the plurality of indicia of bytecode representations that correspond to the first type of blockchain network standard may comprise the system determining a first combination of characters in the plurality of bytecode samples in a threshold number of the plurality of bytecode samples and assigning the first combination of characters as the first indicium. For example, the system may parse the plurality of bytecode samples to identify a combination of characters (e.g., alphanumeric characters in a given order) to identify that the sample corresponds to the first type of blockchain network standard. For example, a type of blockchain network standard may result in recurring combinations of characters. These recurring combinations may be used to identify the blockchain network standard types from the plurality of types of blockchain network standards.

Additionally or alternatively, parsing the plurality of bytecode samples to identify the plurality of indicia of bytecode representations that correspond to the first type of blockchain network standard may comprise the system mapping portions of the plurality of bytecode samples, locating a first portion of the plurality of bytecode samples, and parsing the first portion to determine the first combination of characters. For example, the system may parse the plurality of bytecode samples to identify a portion of the sample in which a combination of characters (e.g., alphanumeric characters in a given order) identify that the sample corresponds to the first type of blockchain network standard. For example, a type of blockchain network standard may result in recurring combinations of characters and/or may result in that combination appearing at a given location. These recurring combinations and/or at a given location may be used to identify the blockchain network standard types from the plurality of types of blockchain network standards.

In some embodiments, assigning the first combination of characters as the first indicium may comprise the system generating a record for the first indicium, adding the first combination of characters to the record, and adding a location of the first portion to the record. For example, the system may generate a plurality of indicia of bytecode representations and may store each of the indicia along with information about the specific bytecode representation to which they correspond, a type of blockchain network standard to which they correspond, and/or a blockchain operation. The system may store this information along with information about the indicia (e.g., a likely location of the indicia) in a record.

In some embodiments, retrieving the plurality of bytecode samples corresponding to the first type of blockchain network standard of the blockchain network may comprise the system accessing a blockchain node, retrieving a plurality of runtime bytecode samples from blocks on the blockchain node, wherein the plurality of runtime bytecode samples comprises non-human readable text, and extracting the plurality of bytecode samples from the plurality of runtime bytecode samples. For example, to generate the bytecode samples and/or bytecode representations described herein, the system may use an EVM decompiler to extract information from runtime bytecode and present it in a more human readable form. For example, runtime bytecode samples may comprise machine code that is not human readable. The system may in turn use a decompiler (e.g., Solidity) to format portions of the runtime bytecode samples into human readable text. Additionally, or alternatively, the system may generate the bytecode samples and/or bytecode representations directly from runtime bytecode (e.g., without first decompiling).

Additionally or alternatively, the system may determine that the blocks comprise blockchain operations of the first type of blockchain network standard. The system may, in response to determining that the blocks comprise blockchain operations of the first type of blockchain network standard, parse the blocks to retrieve the plurality of runtime bytecode. For example, in order to generate a plurality of runtime bytecode samples, the system may determine blocks of a blockchain network that contain blockchain operations (e.g., transactions) corresponding to the first type of blockchain network standard (e.g., ERC-721). The system may then perform a blockchain operation to confirm that the first blockchain operation corresponds to the first type of blockchain network standard. For example, upon detecting that bytecode for a given smart contract includes the bytecode representations, the system confirms that the given smart contract is of the relevant type using a function that does not allow a state change operation to the blockchain (e.g., "contractAddress.staticcall . . . ").

Additionally, or alternatively, when retrieving the plurality of bytecode samples corresponding to the first type of blockchain network standard of the blockchain network, the system may generate a plurality of sample blockchain operations, compile the plurality of sample blockchain operations into a plurality of runtime bytecode samples, and extract the plurality of bytecode samples from the plurality of runtime bytecode samples. For example, in some embodiments, the system may generate the plurality of sample blockchain operations and use a compiler to generate runtime bytecode samples. By doing so, the system may generate training data from which the system may extract the plurality of bytecode samples from the plurality of runtime bytecode samples.

At step 804, process 800 (e.g., using one or more components described above) retrieves a first bytecode sample. For example, the system may retrieve a first bytecode sample corresponding to a first block of the blockchain network. In some embodiments, the system may retrieve the first bytecode sample corresponding to the first block of the blockchain network. The system may access a blockchain node. The system may retrieve a first runtime bytecode sample from the blockchain node. The system may extract the first bytecode sample from the first runtime bytecode sample, wherein extracting the first bytecode sample from the first runtime bytecode sample comprises formatting a portion of the first runtime bytecode sample into human readable text. For example, to generate the bytecode samples and/or bytecode representations described herein, the system may use an EVM decompiler to extract information from runtime bytecode and present it in a more human readable form. Additionally, or alternatively, the system may generate the bytecode samples and/or bytecode representations directly from runtime bytecode (e.g., without first decompiling).

In some embodiments, the first bytecode sample and the first indicium are dynamical length variables. For example, dynamic string variables contain character data of arbitrary length, which are in contrast to variables of a set or static length. Internally, each string variable may use a set number of bytes (e.g., four bytes) that contain a handle number, which is used to identify and locate information about a string. Additionally, or alternatively, string variables may use alphanumeric variables or character variables (e.g., may include numbers, letters, or symbols). Variable length strings are a convenient abstraction that may provide easier initial programming and/or minimize re-formatting between applications, particularly in decentralized application. Furthermore, the re-formatting that is necessary may be optimized to minimize processing resources. By doing so, string operations are unlikely to bottleneck, and the system may provide additional versatility in searching for specific samples and/or indicia within those samples that are known to be of a specific size.

In some embodiments, the first bytecode sample and the first indicium are fixed length variables. In some embodiments, the system may retrieve bytecode samples that are fixed length. For example, a system may store indicia in memory, using a character limit. The system may then have fast, direct access without having to go through pointers and allow memory allocation to be trivial. For example, a string field or parameter may be defined at a specific length, by appending the number of characters to the type name. They may also be defined as variable length by simply not defining the length. String fields or parameters that are known to always be a specific size should be declared as the exact size needed. This will improve efficiency and performance by allowing the compiler (or decompiler) to optimize for that specific string size and not incur the overhead of dynamically calculating the variable length at runtime.

At step 806, process 800 (e.g., using one or more components described above) compares the first indicium to the first bytecode sample. For example, the system may compare the first indicium to the first bytecode sample to determine a first probability that the first block comprises a first bytecode representation corresponding to the first type of blockchain network standard. The system may then compare the first probability to a threshold probability.

At step 808, process 800 (e.g., using one or more components described above) identifies a first bytecode representation in the first bytecode sample. For example, in response, determining that the first probability equals or exceeds the threshold probability, the system may identify a first bytecode representation in the first bytecode sample.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving a first input, wherein the first input indicates a first type of blockchain network standard of a plurality of types of blockchain network standards for detection; in response to receiving the first input, determining a first standard-specific constant corresponding to the first type of blockchain network standard; generating a first bytecode representation of the first standard-specific constant; retrieving a first bytecode sample corresponding to a first block of a blockchain network; parsing the first bytecode sample using the first bytecode representation to determine a first probability that the first block comprises a first blockchain operation corresponding to the first type of blockchain network standard; comparing the first probability to a threshold probability; and in response, determining that the first probability equals or exceeds the threshold probability, executing a first function on the first block to confirm that the first blockchain operation corresponds to the first type of blockchain network standard.

2. A method, the method comprising: receiving a first input, wherein the first input indicates a first type of blockchain network standard of a plurality of types of blockchain network standards for detection; in response to receiving the first input, determining a first standard-specific constant corresponding to the first type of blockchain network standard, including: generating a first bytecode representation of the first standard-specific constant; and using the first bytecode representation to determine whether a first blockchain operation corresponds to the first type of blockchain network standard, including: executing a first function on the first input to confirm that the first blockchain operation corresponds to the first type of blockchain network standard.

3. The method of any one of the preceding embodiments, wherein the standard-specific constant comprises a compiling of an indicium of a plurality of indicia of bytecode representations that correspond to a first type of blockchain network standard of a blockchain network.

4. The method of any one of the preceding embodiments, wherein the standard-specific constant comprises compile-time values, which do not change after being compiled.

5. The method of any one of the preceding embodiments, wherein determining the first standard-specific constant corresponding to the first type of blockchain network standard further comprises: accessing a blockchain node; retrieving a plurality of runtime bytecode samples from blocks on the blockchain node, wherein the plurality of runtime bytecode samples comprises non-human readable text; extracting the plurality of bytecode samples from the plurality of runtime bytecode samples; and determining the first standard-specific constant based on the plurality of bytecode samples.

6. The method of any one of the preceding embodiments, wherein executing the first function further comprises: accessing an application binary interface; and causing the application binary interface to execute a STATICCALL opcode in the EVM.

7. The method of any one of the preceding embodiments, wherein the first function comprises a function with a value argument of zero.

8. The method of any one of the preceding embodiments, wherein the first input further comprises a known contract address, and wherein parsing the first bytecode sample further comprises determining a second probability that the first blockchain operation corresponds to the known contract address.

9. The method of any one of the preceding embodiments, wherein generating the first bytecode representation further comprises: determining a first combination of characters in the plurality of bytecode samples in a threshold number of the plurality of bytecode samples; and assigning the first combination of characters as the first bytecode representation.

10. The method of any one of the preceding embodiments, wherein generating the first bytecode representation further comprises: mapping portions of the plurality of bytecode samples; locating a first portion of the plurality of portions; and parsing the first portion to determine the first combination of characters.

11. The method of any one of the preceding embodiments, wherein assigning the first combination of characters as the first bytecode representation further comprises: generating a record for the first bytecode representation; adding the first combination of characters to the record; and adding a location of the first portion to the record.

12. A method, the method comprising: retrieving a first bytecode sample corresponding to a first blockchain operation in a first block of a blockchain network; parsing the first bytecode sample to identify a first bytecode representation corresponding to a first contract address; in response to identifying the first bytecode representation, comparing the first contract address to a plurality of known contract addresses; determining a first known contract address of the plurality of known contract addresses corresponds to the first contract address; and indexing, using an indexing application, at least a portion of the first block by recording data corresponding to the first blockchain operation as corresponding to the first known contract address.

13. The method of any one of the preceding embodiments, wherein the method is for indexing blockchain operations based on identifying unindexed parameters and other information in raw blockchain data samples.

14. The method of any one of the preceding embodiments, wherein parsing the first bytecode sample further comprises: segregating portions of first bytecode samples; and parsing the portions for bytecode representations.

15. The method of any one of the preceding embodiments, wherein indexing the first block by recording the first blockchain operation as corresponding to the first known contract address further comprises: retrieving a first record for the first known contract address; and adding the first blockchain operation to the first record.

16. The method of any one of the preceding embodiments, further comprising: retrieving a second bytecode sample corresponding to a second blockchain operation in the first block of the blockchain network; parsing the second bytecode sample to identify a second bytecode representation corresponding to a second contract address; in response to identifying the second bytecode representation, comparing the second contract address to the plurality of known contract addresses to determine whether the second contract address is included in the plurality of known contract addresses; in response to determining that the second contract address is not included in the plurality of known contract addresses, generating a new known contract address for inclusion in the plurality of known contract addresses; and further indexing, using the indexing application, the first block by recording the second blockchain operation as corresponding to the new known contract address.

17. The method of any one of the preceding embodiments, wherein generating the new known contract address for inclusion in the plurality of known contract addresses further comprises: generating a second record for the new known contract address; adding the second bytecode representation to the second record; and adding the second contract address to the second record.

18. The method of any one of the preceding embodiments, wherein parsing the first bytecode sample to identify the first bytecode representation corresponding to the first contract address further comprises: accessing a blockchain node; retrieving a runtime bytecode sample from a block on the blockchain node, wherein the runtime bytecode sample comprises non-human readable text; and extracting the first bytecode sample from the runtime bytecode sample.

19. The method of any one of the preceding embodiments, wherein parsing the first bytecode sample to identify the first bytecode representation corresponding to the first contract address further comprises: determining a probability that the first bytecode representation corresponds to a potential contract address; and comparing the probability to a threshold probability.

20. The method of any one of the preceding embodiments, wherein generating the first bytecode representation further comprises: determining a first combination of characters in the plurality of bytecode samples in a threshold number of a plurality of bytecode samples corresponding to the first known contract address; and assigning the first combination of characters as the first bytecode representation.

21. The method of any one of the preceding embodiments, wherein generating the first bytecode representation further comprises: mapping portions of the plurality of bytecode samples; locating a first portion of the first bytecode sample; and parsing the first portion to determine the first combination of characters.

22. The method of any one of the preceding embodiments, wherein assigning the first combination of characters as the first bytecode representation further comprises: generating a record for the first bytecode representation; adding the first combination of characters to the record; and adding a location of the first portion to the record.

23. A method, the method comprising: retrieving a first indicium of a plurality of indicia of bytecode representations that correspond to a first type of blockchain network standard of a blockchain network, wherein the plurality of indicia is based on: retrieving a plurality of bytecode samples corresponding to the first type of blockchain network standard of the blockchain network; and parsing the plurality of bytecode samples to identify the plurality of indicia of bytecode representations that correspond to the first type of blockchain network standard; retrieving a first bytecode sample corresponding to a first block of the blockchain network; comparing the first indicium to the first bytecode sample to determine a first probability that the first block comprises a first bytecode representation corresponding to the first type of blockchain network standard; comparing the first probability to a threshold probability; and in response, determining that the first probability equals or exceeds the threshold probability, identifying a first bytecode representation in the first bytecode sample.

24. The method of the preceding embodiment, wherein the method is for generating bytecode representations used to identifying unindexed parameters and other information in raw blockchain data.

25. The method of any one of the preceding embodiments, wherein retrieving the plurality of bytecode samples corresponding to the first type of blockchain network standard of the blockchain network further comprises: accessing a blockchain node; retrieving a plurality of runtime bytecode samples from blocks on the blockchain node, wherein the plurality of runtime bytecode samples comprises non-human readable text; and extracting the plurality of bytecode samples from the plurality of runtime bytecode samples.

26. The method of any one of the preceding embodiments, further comprising: determining that the blocks comprise blockchain operations of the first type of blockchain network standard; and in response to determining that the blocks comprise blockchain operations of the first type of blockchain network standard, parsing the blocks to retrieve the plurality of runtime bytecode samples.

27. The method of any one of the preceding embodiments, wherein retrieving the plurality of bytecode samples corresponding to the first type of blockchain network standard of the blockchain network further comprises: generating a plurality of sample blockchain operations; compiling the plurality of sample blockchain operations into a plurality of runtime bytecode samples; and extracting the plurality of bytecode samples from the plurality of runtime bytecode samples.

28. The method of any one of the preceding embodiments, wherein retrieving the first bytecode sample corresponding to the first block of the blockchain network further comprises: accessing a blockchain node; retrieving a first runtime bytecode sample from the blockchain node; and extracting the first bytecode sample from the first runtime bytecode sample, wherein extracting the first bytecode sample from the first runtime bytecode sample comprises formatting a portion of the first runtime bytecode sample into human readable text.
29. The method of any one of the preceding embodiments, wherein the first bytecode sample and the first indicium are dynamical length variables.
30. The method of any one of the preceding embodiments, wherein the first bytecode sample and the first indicium are fixed length variables.
31. The method of any one of the preceding embodiments, wherein parsing the plurality of bytecode samples to identify the plurality of indicia of bytecode representations that correspond to the first type of blockchain network standard further comprises: determining a first combination of characters in the plurality of bytecode samples in a threshold number of the plurality of bytecode samples; and assigning the first combination of characters as the first indicium.
32. The method of any one of the preceding embodiments, wherein parsing the plurality of bytecode samples to identify the plurality of indicia of bytecode representations that correspond to the first type of blockchain network standard further comprises: mapping portions of the plurality of bytecode samples; locating a first portion of the plurality of bytecode samples; and parsing the first portion to determine the first combination of characters.
33. The method of any one of the preceding embodiments, wherein assigning the first combination of characters as the first indicium further comprises: generating a record for the first indicium; adding the first combination of characters to the record; and adding a location of the first portion to the record.
34. A tangible, non-transitory, machine-readable medium storing instructions that, when executed by a data processing apparatus, cause the data processing apparatus to perform operations comprising those of any of embodiments 1-33.
35. A system comprising one or more processors; and memory storing instructions that, when executed by the processors, cause the processors to effectuate operations comprising those of any of embodiments 1-33.
36. A system comprising means for performing any of embodiments 1-33.

What is claimed is:

1. A system for selectively indexing blockchain operations by parsing raw blockchain data for relevant smart contracts prior to executing confirmatory function calls, the system comprising:
one or more processors and non-transitory media storing instructions that, when executed by the one or more processors, cause operations comprising:
in response to receiving a request related to indexing blockchain operations related to one or more smart contracts that correspond to a blockchain network standard of a plurality of blockchain network standards, generating a bytecode representation of a standard-specific constant corresponding to the blockchain network standard, wherein the standard-specific constant is determined using a machine learning model trained on labeled standard-specific constants corresponding to the blockchain network standard to detect the standard-specific constant;
parsing a bytecode sample corresponding to a block of a blockchain network using the bytecode representation of the standard-specific constant to determine a probability that the block comprises a blockchain operation corresponding to the blockchain network standard; and
in response to determining that the probability equals or exceeds a threshold probability, executing a first function on data in the request to confirm that the blockchain operation corresponds to the blockchain network standard.

2. A method for selectively indexing blockchain operations by parsing raw blockchain data for relevant smart contracts prior to executing confirmatory function calls, the method comprising:
receiving a first input that indicates a first type of blockchain network standard of a plurality of types of blockchain network standards for detection;
generating a first bytecode representation of a first standard-specific constant corresponding to the first type of blockchain network standard, wherein generating the first bytecode representation of the first standard-specific constant comprises:
determining a first combination of characters in a plurality of bytecode samples in a threshold number of the plurality of bytecode samples; and
assigning the first combination of characters as the first bytecode representation of the first standard-specific constant;
using the first bytecode representation of the first standard-specific constant to determine a probability related to whether a first blockchain operation corresponds to the first type of blockchain network standard;
determining that the probability equals or exceeds a threshold probability; and
in response determining that the probability equals or exceeds the threshold probability, executing a first function on the first input to confirm that the first blockchain operation corresponds to the first type of blockchain network standard.

3. The method of claim 2, wherein the first standard-specific constant comprises a compiling of an indicium of a plurality of indicia of bytecode representations that correspond to the first type of blockchain network standard of a blockchain network, and wherein the first standard-specific constant comprises compile-time values, which do not change after being compiled.

4. The method of claim 2, wherein determining the first standard-specific constant corresponding to the first type of blockchain network standard further comprises:
accessing a blockchain node;
retrieving a plurality of runtime bytecode samples from blocks on the blockchain node, wherein the plurality of runtime bytecode samples comprises non-human readable text;
extracting the plurality of bytecode samples from the plurality of runtime bytecode samples; and
determining the first standard-specific constant based on the plurality of bytecode samples.

5. The method of claim 2, wherein executing the first function further comprises:
accessing an application binary interface; and
causing the application binary interface to execute a STATICCALL opcode in an Ethereum Virtual Machine (EVM).

6. The method of claim 2, wherein the first function comprises a function with a value argument of zero.

7. The method of claim 2, wherein the first input further comprises a known contract address, and wherein using the first bytecode representation to determine the probability related to whether the first blockchain operation corresponds to the first type of blockchain network standard comprises:
retrieving a first bytecode sample corresponding to a first block of a blockchain network;
parsing the first bytecode sample using the first bytecode representation of the first standard-specific constant to determine a first probability that the first block comprises the first blockchain operation corresponding to the first type of blockchain network standard, wherein parsing the first bytecode sample further comprises determining a second probability that the first blockchain operation corresponds to the known contract address; and
comparing the first probability to the threshold probability, and determining that the first probability equals or exceeds the threshold probability,
wherein executing the first function comprises in response determining that the first probability equals or exceeds the threshold probability, executing the first function on the first input to confirm that the first block comprises the first blockchain operation corresponding to the first type of blockchain network standard.

8. The method of claim 2, wherein generating the first bytecode representation of the first standard-specific constant comprises:
mapping a plurality of portions of the plurality of bytecode samples;
locating a first portion of the plurality of portions; and
parsing the first portion to determine the first combination of characters.

9. The method of claim 8, wherein assigning the first combination of characters as the first bytecode representation of the first standard-specific constant comprises:
generating a record for the first bytecode representation of the first standard-specific constant;
adding the first combination of characters to the record; and
adding a location of the first portion to the record.

10. One or more non-transitory, computer-readable media comprising instructions that, when executed by one or more processors, cause operations comprising:
in response to receiving a first input that corresponds to a first type of blockchain network standard of a plurality of types of blockchain network standards for detection, generating a first bytecode representation of a first standard-specific constant corresponding to the first type of blockchain network standard, where generating the first bytecode representation of the first standard-specific constant comprises:
retrieving a plurality of runtime bytecode samples from blocks on a blockchain node, wherein the plurality of runtime bytecode samples comprises non-human readable text;
extracting a plurality of bytecode samples from the plurality of runtime bytecode samples; and
determining the first standard-specific constant based on the plurality of bytecode samples;
using the first bytecode representation of the first standard-specific constant to determine a probability related to whether a first blockchain operation corresponds to the first type of blockchain network standard; and
in response to determining that the probability equals or exceeds a threshold probability, executing a first function on the first input to confirm that the first blockchain operation corresponds to the first type of blockchain network standard.

11. The one or more non-transitory, computer-readable media of claim 10, wherein the first standard-specific constant comprises compiling of an indicium of a plurality of indicia of bytecode representations that correspond to the first type of blockchain network standard of a blockchain network, and wherein the first standard-specific constant comprises compile-time values, which do not change after being compiled.

12. The one or more non-transitory, computer-readable media of claim 10, wherein determining the first standard-specific constant corresponding to the first type of blockchain network standard comprises using a machine learning model trained using labeled standard-specific constants corresponding to the first type of blockchain network standard to detect the first standard-specific constant.

13. The one or more non-transitory, computer-readable media of claim 10, wherein executing the first function comprises:
accessing an application binary interface; and
causing the application binary interface to execute a STATICCALL opcode in an EVM.

14. The one or more non-transitory, computer-readable media of claim 10, wherein the first function comprises a function with a value argument of zero.

15. The one or more non-transitory, computer-readable media of claim 10, wherein the first input further comprises a known contract address, and wherein using the first bytecode representation to determine the probability related to whether the first blockchain operation corresponds to the first type of blockchain network standard comprises:
retrieving a first bytecode sample corresponding to a first block of a blockchain network;
parsing the first bytecode sample using the first bytecode representation of the first standard-specific constant to determine a first probability that the first block comprises the first blockchain operation corresponding to the first type of blockchain network standard, wherein parsing the first bytecode sample further comprises determining a second probability that the first blockchain operation corresponds to the known contract address; and
comparing the first probability to the threshold probability,
wherein executing the first function comprises in response determining that the first probability equals or exceeds the threshold probability, executing the first function on the first input to confirm that the first block comprises the first blockchain operation corresponding to the first type of blockchain network standard.

16. The one or more non-transitory, computer-readable media of claim 10, wherein generating the first bytecode representation comprises:
determining a first combination of characters in a plurality of bytecode samples in a threshold number of the plurality of bytecode samples; and
assigning the first combination of characters as the first bytecode representation, wherein assigning the first combination of characters as the first bytecode representation further comprises:
generating a record for the first bytecode representation of the first standard-specific constant;
adding the first combination of characters to the record; and
adding a location of a first portion of the plurality of bytecode samples to the record.

17. The one or more non-transitory, computer-readable media of claim 16, wherein generating the first bytecode representation comprises:
- mapping a plurality of portions of the plurality of bytecode samples, the plurality of portions comprising the first portion;
- locating the first portion of the plurality of portions; and
- parsing the first portion to determine the first combination of characters.

* * * * *